US008101882B2

(12) United States Patent
Mather et al.

(10) Patent No.: US 8,101,882 B2
(45) Date of Patent: Jan. 24, 2012

(54) PLASMA TORCH ELECTRODE WITH IMPROVED INSERT CONFIGURATIONS

(75) Inventors: Jonathan P. Mather, Cornish Flat, NH (US); David J. Cook, Bradford, VT (US); David L. Bouthillier, Hartford, VT (US); John Sobr, Lebanon, NH (US); Stephen T. Eickhoff, Hanover, NH (US)

(73) Assignee: Hypertherm, Inc., Hanover, NH (US)

( * ) Notice: Subject to any disclaimer, the term of this patent is extended or adjusted under 35 U.S.C. 154(b) by 1283 days.

(21) Appl. No.: 11/468,393

(22) Filed: Aug. 30, 2006

(65) Prior Publication Data

US 2007/0125755 A1 Jun. 7, 2007
US 2008/0272094 A9 Nov. 6, 2008

Related U.S. Application Data

(60) Provisional application No. 60/714,581, filed on Sep. 7, 2005.

(51) Int. Cl.
*B23K 10/00* (2006.01)

(52) U.S. Cl. ................ 219/121.52; 219/75; 219/121.51; 313/231.41

(58) Field of Classification Search ............... 219/121.5, 219/121.48, 121.52, 119, 121.59, 121.46, 219/74, 75; 313/231.31, 231.41
See application file for complete search history.

(56) References Cited

U.S. PATENT DOCUMENTS

| | | | |
|---|---|---|---|
| 3,408,518 | A | 10/1968 | Strupczewski |
| 4,864,097 | A | 9/1989 | Wallner |
| 5,023,425 | A | 6/1991 | Severance, Jr. |
| 5,083,005 | A | 1/1992 | Degrigny |
| 5,097,111 | A | 3/1992 | Severance, Jr. |
| 5,105,061 | A | 4/1992 | Blankenship |
| 5,396,043 | A | 3/1995 | Couch, Jr. et al. |
| 5,676,864 | A | 10/1997 | Walters |
| 5,756,959 | A | 5/1998 | Freeman et al. |
| 5,767,478 | A | 6/1998 | Walters |
| 6,020,572 | A | 2/2000 | Marner et al. |
| 6,066,827 | A | 5/2000 | Nemchinsky |
| 6,114,650 | A | 9/2000 | Marner et al. |

(Continued)

FOREIGN PATENT DOCUMENTS

EP 1 202 614 A2 5/2002

OTHER PUBLICATIONS

Notification of Transmittal of the International Search Report and the Written Opinion of the International Searching Authority, or the Declaration for PCT/US2006/034444, mailed on Dec. 18, 2006.

(Continued)

*Primary Examiner* — Mark Paschall
(74) *Attorney, Agent, or Firm* — Proskauer Rose LLP

(57) ABSTRACT

An improved electrode for use in a plasma arc torch. The electrode includes an electrode body, a bore defined by and disposed in the electrode body, and an insert disposed in the bore. The insert and/or the bore of the electrode are configured to improve retention of the insert in the electrode, thereby extending electrode life. The invention also includes a method for forming the electrode. The method includes a step of positioning an insert into a bore of an electrode such that an exterior gap is established that is greater than a second gap.

44 Claims, 20 Drawing Sheets

U.S. PATENT DOCUMENTS 6,130,399 A 10/2000 Lu et al.
6,177,647 B1 1/2001 Zapletal
6,329,627 B1 * 12/2001 Walters .................... 219/121.52
6,614,001 B2 9/2003 Hackett et al.
6,841,754 B2 1/2005 Cook et al.
2005/0161443 A1 7/2005 Krink et al.

OTHER PUBLICATIONS

European Patent Office Search Report for Application No./Patent No. 06254615.5, dated Dec. 18, 2006.

* cited by examiner

PLASMA TORCH ELECTRODE WITH IMPROVED INSERT CONFIGURATIONS

RELATED APPLICATIONS

This application claims priority to and benefit of U.S. provisional patent application Ser. No. 60/714,581, filed on Sep. 7, 2005, the entire contents of which are incorporated herein by reference.

FIELD OF THE INVENTION

The invention generally relates to the field of plasma arc torch systems and processes. More specifically, the invention relates to improved insert configurations in electrodes for use in a plasma arc torch, and methods of manufacturing such electrodes.

BACKGROUND OF THE INVENTION

Plasma arc torches are widely used in the high temperature processing (e.g., cutting, welding, and marking) of metallic materials. As shown in FIG. 1A, a plasma arc torch generally includes a torch body 1, an electrode 2 mounted within the body, an insert 3 disposed within a bore of the electrode 2, a nozzle 4 with a central exit orifice, a shield 5, electrical connections (not shown), passages for cooling and arc control fluids, a swirl ring to control the fluid flow patterns, and a power supply (not shown). The torch produces a plasma arc, which is a constricted ionized jet of a plasma gas with high temperature and high momentum. A gas can be non-reactive, e.g. nitrogen or argon, or reactive, e.g. oxygen or air.

In the process of plasma arc cutting or marking a metallic workpiece, a pilot arc is first generated between the electrode (cathode) and the nozzle (anode). The pilot arc ionizes gas that passes through the nozzle exit orifice. After the ionized gas reduces the electrical resistance between the electrode and the workpiece, the arc then transfers from the nozzle to the workpiece. Generally the torch is operated in this transferred plasma arc mode, which is characterized by the conductive flow of ionized gas from the electrode to the workpiece, for the cutting, welding, or marking the workpiece.

In a plasma arc torch using a reactive plasma gas, it is known to use a copper electrode with an insert of high thermionic emissivity material. FIGS. 1B-1D illustrate a known method for inserting and securing an insert into the bore of an electrode. FIG. 1B illustrates an insert 10 being pressed 15 into a bore in the end of an electrode body 12. FIG. 1C illustrates the secured insert 11 pressed 15 flush with the end surface 19 of the electrode body 12, and presents a diagrammatic representation of the resultant lateral forces securing the insert 11 in the electrode body 12. These resultant forces are thought to be greater near the exposed end of the insert due to surface friction from the expanding insert. When assembling inserts of known configuration into straight-walled bores, the insert tends to expand radially more near the top of the bore than at the closed end of the bore, tending to produce a wedge shape. A radial bulge sometimes forms near the open end of the bore 14. This tapered bulge is not unexpected since the insert is pressed only from the exposed end. During pressing, once the bore is essentially filled with the insert and can no longer accept more insert material, any remaining insert material pressed in from the open end of the bore tends to form a bulge at the open end of the bore where the hoop strength of the electrode body is not as great. The resulting configuration initially secures the insert, but any movement of the insert towards the opening of the bore significantly reduces the surface contact and retention force of the insert. FIG. 1D illustrates a secured insert 17 in a through-hole configuration of the bore, where 19 is a volume defined by the inner surface of the electrode body 16. The insert 17 is pressed from both sides in this configuration, where the force 18 can be supplied from an anvil or mandrel pressed into the volume 19, for installation of the insert. Electrode bodies of the through-hole type 19 are also known to have linear-tapered walls, i.e., straight walls at an angle with a central longitudinal axis, with linear-tapered inserts shaped to match.

The insert has an exterior, or exposed, end face, which defines an emissive surface area. The exterior surface of the insert is generally planar, and is manufactured to be coplanar with the end face of the electrode. The end face of the electrode is typically planar, although it can have exterior curved surfaces, e.g., edges. It is known to make the insert of hafnium or zirconium. They generally have a cylindrical shape. Insert materials (e.g., hafnium) can be expensive.

During the operation of plasma arc torch electrodes, torch conditions such as temperature gradients and dynamics work to reduce the retention force holding the insert in place and either allow the insert to move in the bore or to fall completely out of the bore, thereby reducing the service life of the electrode or causing it to completely fail. The movement of the insert also indicates that the insert to electrode interface has degraded, which reduces the thermal and electrical conductivity of the interface and thereby the service life of the electrode as well. In addition, insert materials (e.g., hafnium) are poor thermal conductors for the removal of heat produced by the plasma arc, which can produce temperatures in excess of 10,000 degrees C. Insufficient removal of heat resulting from these high temperatures can result in a decrease in the service life of the electrode.

What is needed is an electrode with improved retention of the insert within the bore. A first object of the invention is to provide an electrode with improved retention of an insert, increasing the thermal conductivity of the interface between insert and electrode, and the efficiency and service life of the electrode. It is another object of the invention to provide an electrode with an insert configuration that improves the cooling, and therefore the service life, of the insert. It is yet another object of the invention to provide an electrode with an insert configuration that minimizes the amount of insert material required, thereby reducing the cost of the electrode while at the same time not lessening the efficiency and service life of the electrode. Yet another object of the invention is to provide an electrode with a longer service life.

SUMMARY OF THE INVENTION

The present invention achieves these objectives by using electrode bore and/or insert configurations to establish retention forces located near an interior (e.g. a contact end or a central portion) of the insert or an interior (e.g., a closed end or a central portion) of the bore to secure the insert in the electrode. The present invention also allows the size of the insert to be minimized, thereby reducing insert raw material costs and improving electrode cooling.

One aspect of the invention features an electrode for a plasma arc torch, the electrode including an electrode body formed of a high thermal conductivity material. The electrode body includes a first end and a second end defining a longitudinal axis. A bore is defined by and disposed in the first end of the electrode body. The bore includes a closed end and an open end. The bore defines at least a first and a second dimension each transverse to the longitudinal axis, wherein the second dimension is closer to the closed end of the bore than the first dimension. The electrode also includes an insert formed of a high thermionic emissivity material disposed in the bore. The insert includes an exterior end disposed near the open end of the bore and a contact end disposed near the closed end of the bore. The insert defines at least a first and a second dimension each transverse to the longitudinal axis, wherein the second dimension is closer to the closed end of the bore than the first dimension. The second dimension of the bore is greater than the first dimension of the bore, or the second dimension of the insert is greater than the first dimension of the insert. In some embodiments, the electrode further comprises a sleeve disposed between the insert and the bore. The second dimension can correspond to an annular notch.

Another aspect of the invention features an electrode for a plasma arc torch, the electrode including an electrode body formed of a high thermal conductivity material. The electrode body includes a first end and a second end defining a longitudinal axis. A bore is defined by and disposed in the first end of the electrode body. The bore includes a first portion, a second portion, and a third portion, wherein the first portion includes an outer open end of the bore and the third portion includes an inner open end of the bore. The second portion of the bore defines at least a first and a second dimension each transverse to the longitudinal axis, wherein the second dimension is closer to the third portion of the bore than the first dimension. The electrode also includes an insert formed of a high thermionic emissivity material disposed in the bore. The insert includes a first portion, a second portion, and a third portion. The first portion includes an exterior end disposed near the outer open end of the bore and the third portion includes an end disposed near the inner open end of the bore. The insert defines at least a first and a second dimension each transverse to the longitudinal axis, wherein the second dimension is closer to the third portion of the insert than the first dimension. The second dimension of the bore is greater than the first dimension of the bore, or the second dimension of the insert is greater than the first dimension of the insert. In some embodiments, the electrode further comprises a sleeve disposed between the insert and the bore. The second dimension can correspond to an annular notch.

Another aspect of the invention features an electrode for a plasma arc torch. The electrode includes an electrode body formed of a high thermal conductivity material. The electrode body includes a first end and a second end defining a longitudinal axis. A bore is defined by and disposed in the first end of the electrode body. The bore includes a first end and a second end. The first end of the bore includes an open end of the bore. The electrode also includes an insert formed of a high thermionic emissivity material disposed in the bore. The insert has a longitudinal length and includes a first end portion, a second end portion, a first portion between the first and the second end portions, and a second portion between the first and the second end portions. The first end portion includes an exterior end surface disposed near the open end of the bore, and a longitudinal length of the first end portion being no more than about 10% of the longitudinal length of the insert. The second end portion includes a longitudinal length of the second end portion being no more than about 20% of the longitudinal length of the insert. The first portion defines a first dimension transverse to the longitudinal axis, and includes a first exterior surface. The second portion defines a second dimension transverse to the longitudinal axis and includes a second exterior surface, wherein the first dimension is greater than the second dimension. A first angle of a tangent to the first exterior surface with respect to the longitudinal axis and a second angle of a tangent to the second exterior surface with respect to the longitudinal axis differ by at least 3 degrees. In some embodiments, the longitudinal length of the first end portion is no more than about 2% of the longitudinal length of the insert and/or the longitudinal length of the second end portion is no more than about 10% of the longitudinal length of the insert. The high thermionic emissivity material of the insert can be hafnium or zirconium, or tungsten, or thorium or lanthanum or strontium or alloys thereof. The high thermal conductivity material of the electrode body can be copper or a copper alloy. A central portion of the bore can include at least two substantially cylindrical portions. A central body portion of the insert can include at least two substantially cylindrical portions. At least one of a central portion of the bore and a central body portion of the insert can be substantially cylindrical. The bore can comprise an annular extension. The insert can comprise a flared head.

Another aspect of the invention features an electrode for a plasma arc torch. The electrode includes an electrode body formed of a high thermal conductivity material. The electrode body includes a first end and a second end defining a longitudinal axis. A bore is defined by and disposed in the first end of the electrode body. The bore includes an open end and a closed end. The electrode also includes an insert formed of a high thermionic emissivity material disposed in the bore. The insert comprises a first exterior surface exerting a first force against a first surface of the bore, and a second exterior surface exerting a second force against a second surface of the bore. The second force is greater than the first force, and the second surface of the bore is longitudinally closer to the closed end of the bore than the first surface of the bore. In some embodiments, the high thermionic emissivity material of the insert can be hafnium or zirconium. The high thermal conductivity material of the electrode body can be copper or a copper alloy. The electrode can further comprise a sleeve disposed between the insert and the electrode body. The sleeve can be silver. A central portion of the bore can include at least two substantially cylindrical portions. A central body portion of the insert can include at least two substantially cylindrical portions. At least one of a central portion of the bore and a central body portion of the insert can be substantially cylindrical. The bore can comprise an annular extension. The insert can include a flared head.

Another aspect of the invention features an electrode for a plasma arc torch. The electrode includes an electrode body formed of a high thermal conductivity material. The electrode body includes a first end and a second end defining a longitudinal axis. A bore is defined by and disposed in the first end of the electrode body. The bore includes a first portion, a second portion, and a third portion. The first portion defines an outer open end of the bore. The third portion defines an inner open end of the bore. The electrode also includes an insert formed of a high thermionic emissivity material disposed in the bore. The insert comprises a first exterior surface exerting a first force against a first surface of the second portion of the bore, and a second exterior surface exerting a second force against a second surface of the second portion of the bore. The second force is greater than the first force, and the second surface of the bore is longitudinally closer to the third portion of the bore than the first surface of the bore. In some embodiments, the high thermionic emissivity material of the insert can be hafnium or zirconium. The high thermal conductivity material of the electrode body can be copper or a copper alloy. The electrode further can comprise a sleeve disposed between the insert and the electrode body. The sleeve can be silver. A central portion of the bore can include at least two substantially cylindrical portions. A central body portion of the insert can include at least two substantially cylindrical portions. At least one of a central portion of the bore and a central body portion of the insert can be substantially cylindrical. The bore can comprise an annular extension. The insert can include a flared head.

Another aspect of the invention features an electrode for a plasma arc torch. The electrode includes an electrode body formed of a high thermal conductivity material. The electrode body includes a first end and a second end defining a longitudinal axis. A bore is defined by and disposed in the first end of the electrode body. The bore includes an open end and a closed end. A projection is disposed on a surface of the bore. The surface of the bore is located away from the open end. The electrode also includes an insert formed of a high thermionic emissivity material disposed in the bore. A contact surface of the insert surrounds at least a portion of the projection to secure the insert in the bore. In some embodiments, the projection can be disposed at or near the closed end of the bore, wherein the projection extends partially towards the open end. The projection can comprise barbs, grooves, or notches. The projection can be not integrally formed with the electrode body or the insert. The projection can be substantially symmetrical about the longitudinal axis. The contact surface can be a contact end of the insert.

Another aspect of the invention features a method for fabricating an electrode having an emissive insert for use in plasma arc torches. The method includes the step of forming an electrode body of a high thermal conductivity material, wherein the electrode body includes a first end and a second end defining a longitudinal axis. A bore is formed in the first end, wherein the bore includes a first portion and a second portion. An insert formed of a high thermionic emissivity material is positioned in the bore, the insert including a contact end and an exterior end. The contact end of the insert is aligned with the second portion of the bore, and the exterior end is aligned with the first portion of the bore, such that a first gap is established between a first exterior surface of the insert and the first portion, and a second gap is established between a second exterior surface of the insert and the second portion of the bore. The first gap is substantially greater than the second gap. A force is applied at the exterior end of the insert to secure the insert in the bore. In some embodiments, the bore can further comprise a third portion defining a second open end of the bore, wherein the second portion of the bore is located between the first and third portions of the bore. The second portion of the bore can define a closed end of the bore. The first gap can be nearer the open end of the bore than the second gap. The first gap can be nearer the closed end/second portion of the bore than the second gap. The applied force can be a longitudinal force applied at the exterior end of the insert that reduces the gap. The applied force can be a compressive force that compresses the open end of the bore about the insert. The method can further comprise the step of positioning a sleeve formed of a second material in the bore before the force can be applied, wherein the first gap can be disposed between a surface of the sleeve and the first exterior surface of the insert.

Another aspect of the invention features a plasma arc torch including a torch body, a nozzle within the torch body, a shield disposed adjacent the nozzle, and an electrode mounted relative to the nozzle in the torch body to define a plasma chamber. The shield protects the nozzle from workpiece splatter. The electrode comprises an electrode body formed of a high thermal conductivity material. The electrode body includes a first end and a second end defining a longitudinal axis. A bore is defined by and disposed in the first end of the electrode body. The bore includes a closed end and an open end. The bore defines at least a first and a second dimension each transverse to the longitudinal axis, wherein the second dimension is closer to the closed end of the bore than the first dimension. The electrode also includes an insert formed of a high thermionic emissivity material disposed in the bore. The insert includes an exterior end disposed near the open end of the bore and a contact end disposed near the closed end of the bore. The insert defines at least a first and a second dimension each transverse to the longitudinal axis, wherein the second dimension is closer to the closed end of the bore than the first dimension. The second dimension of the bore is greater than the first dimension of the bore, or the second dimension of the insert is greater than the first dimension of the insert.

BRIEF DESCRIPTION OF THE DRAWINGS

The foregoing discussion will be understood more readily from the following detailed description of the invention, when taken in conjunction with the accompanying drawings, in which.

DETAILED DESCRIPTION

Reference will now be made in detail to embodiments of the invention, one or more examples of which are illustrated in the figures. Each embodiment described or illustrated herein is presented for purposes of explanation of the invention, and not as a limitation of the invention. For example, features illustrated or described as part of one embodiment can be used with another embodiment to yield still a further embodiment. It is intended that the present invention include these and other modifications and variations as further embodiments.

Figure 1A:
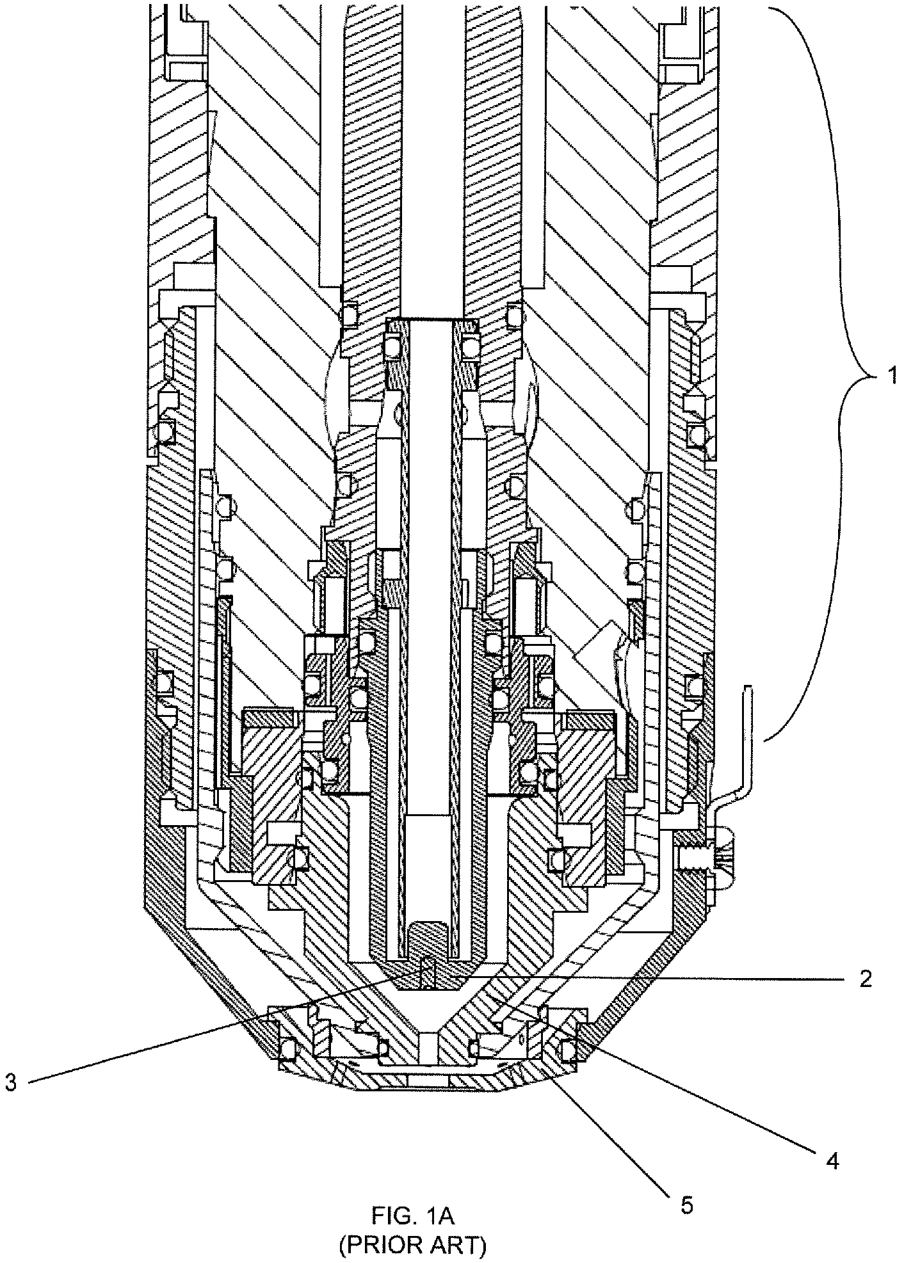
FIG. 1A (PRIOR ART)
FIG. 1A is a partial cross-sectional view of a known plasma arc torch.
Figure 1B:
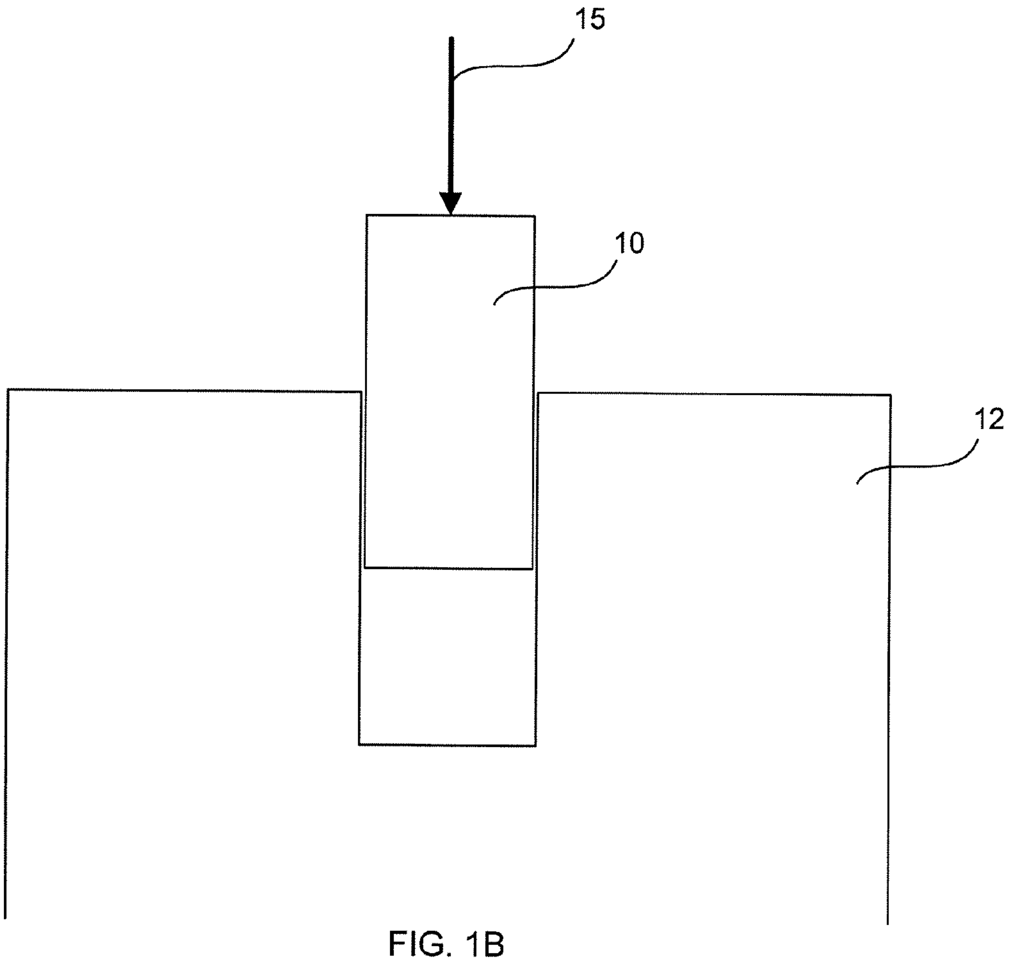
FIG. 1B (PRIOR ART)
FIG. 1B is a partial cross-sectional view of a plasma arc torch electrode illustrating a known method for inserting an insert into an electrode bore.
Figure 1C:
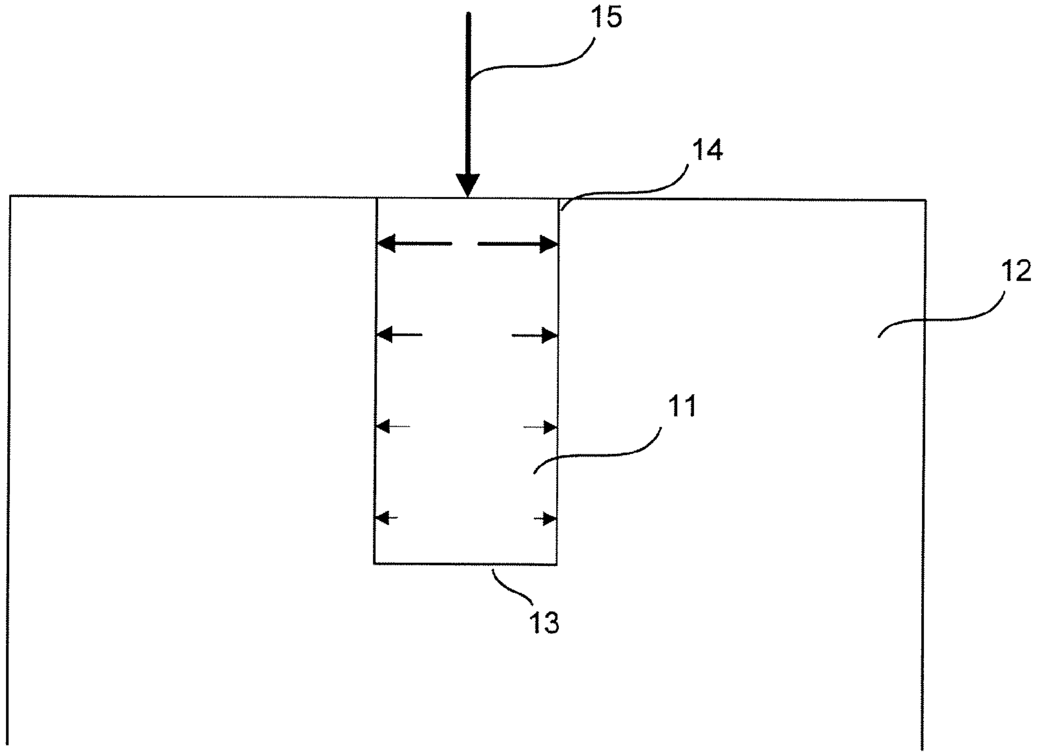
FIG. 1C (PRIOR ART)
FIG. 1C is a partial cross-sectional view of a plasma arc torch electrode illustrating a known method for securing an insert into an electrode bore.
Figure 1D:
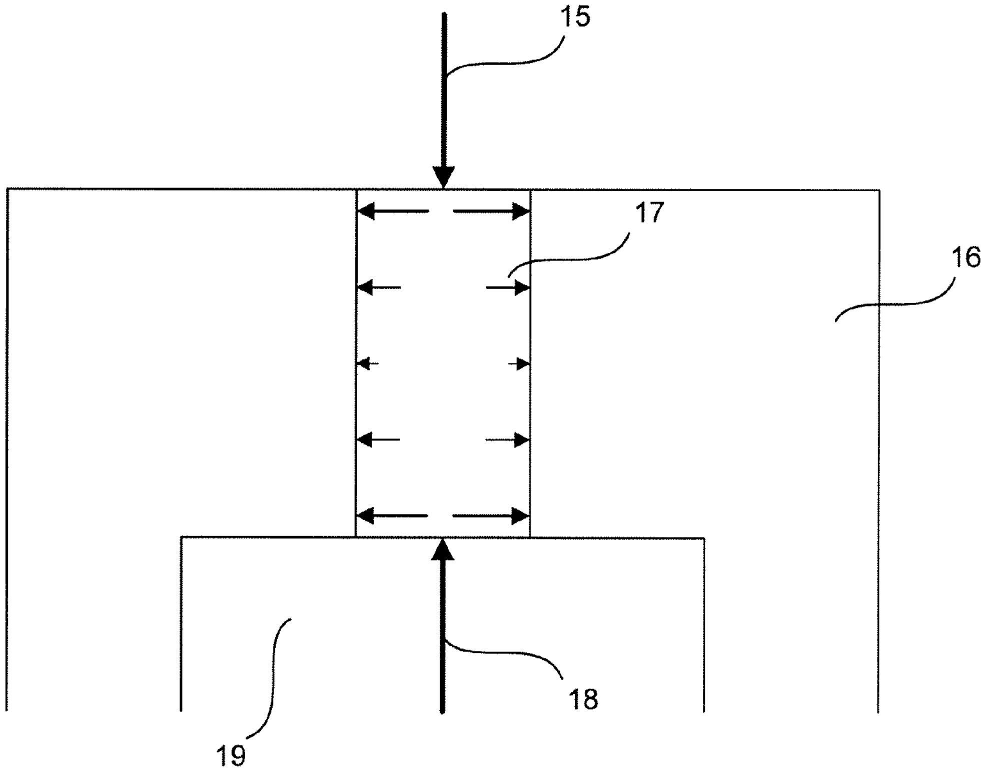
FIG. 1D (PRIOR ART)
FIG. 1D is a partial cross-sectional view of a plasma arc torch electrode illustrating a known method for securing an insert into an electrode bore with a through-hole configuration.
Figure 2A:
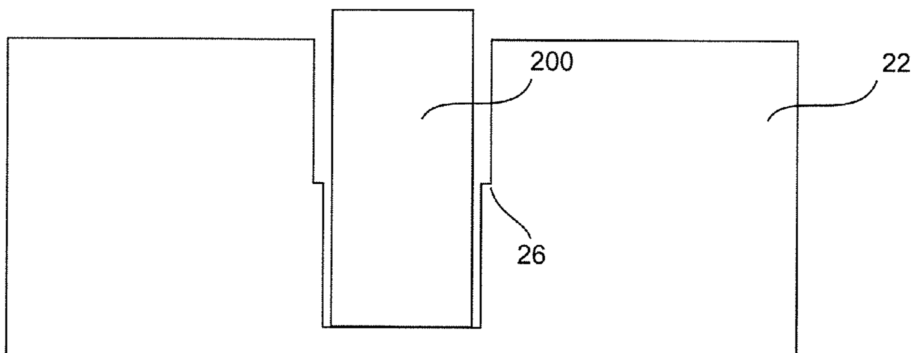
FIGS. 2A-2C are partial cross-sectional views of a plasma arc torch electrode configuration illustrating intermediate steps of a method for securing an insert into an electrode bore incorporating principles of the present invention.
Figure 2B:
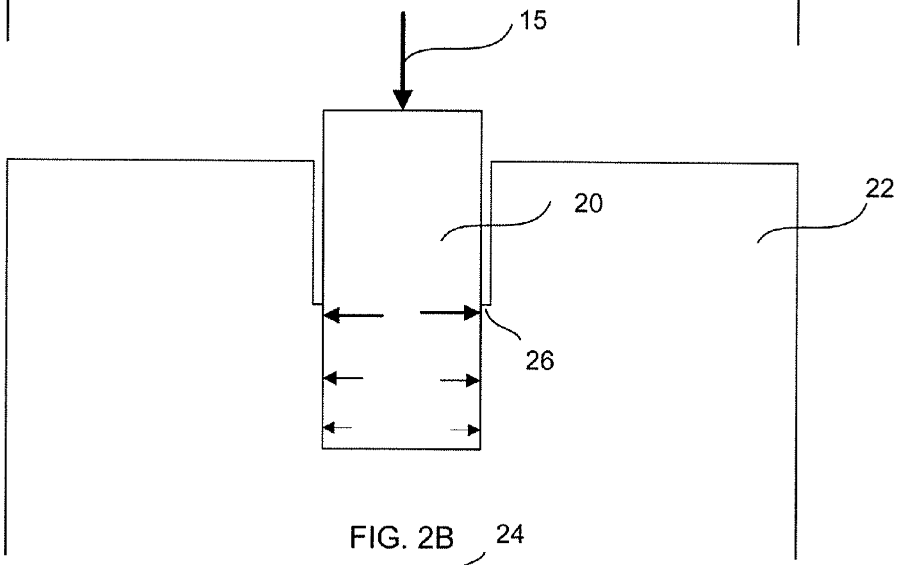
Figure 2C:
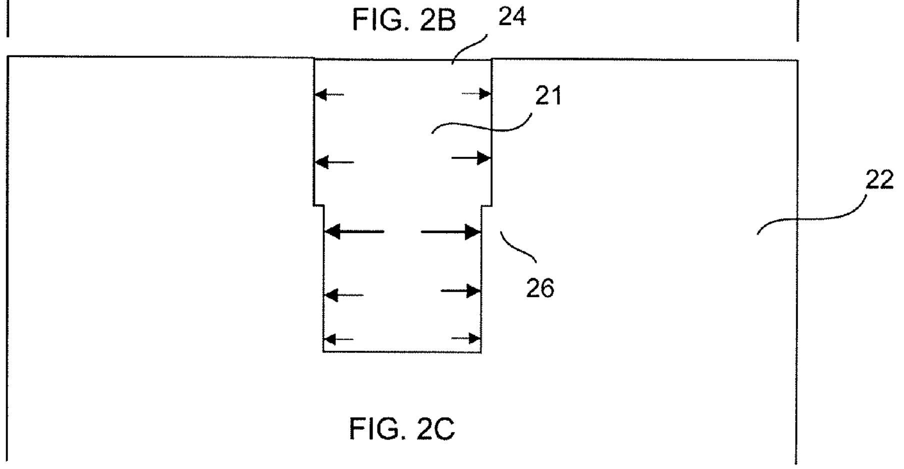

FIGS. 2A-2B illustrate an exemplary method for securing an insert into an electrode bore and the resulting electrode configuration incorporating principles of the present invention. The electrode body 22 comprises a bore in which an insert is to be secured. The bore can include two substantially cylindrical portions, wherein a portion defining the closed end has a diameter smaller than the portion defining the open end of the bore. This discontinuity in diameters can define a step surface 26, which can be located anywhere along the length of the bore. A substantially cylindrical insert 20 with a diameter slightly less than the diameter of the closed end portion of the bore is illustrated. FIG. 2A illustrates an initial configuration of the electrode after a substantially cylindrical insert 200 has been placed in the bore of electrode body 22. The diameter of the insert can be smaller than both diameters of the bore to provide a gap such that the insert 200 can easily fit in the bore. In the situation illustrated, the gap between the insert 200 and the electrode 22 is greater for the open-end cylindrical portion than the gap for the closed-end cylindrical portion. In situations wherein the diameter of the insert is formed to be virtually indistinguishable from the diameter of the closed-end cylindrical portion of the bore, a gap between the insert and the bore around this portion can be small or nonexistent. FIG. 2B illustrates an intermediate configuration of the electrode after the insert 20 has been pressed 15 into the closed end portion of the bore and presents a diagrammatic representation of the initial resultant lateral forces present between the sidewalls of the insert 20 and the electrode body 22. The greater clearance at the top allows the insert to expand more in the bottom of the bore before wall friction from the upper expanding insert material restricts movement near the bottom. As a result, the forces are greater near the step surface 26 due to surface friction from the expanding insert. The applied pressure 15 eventually forces the insert 20 to expand into the open end portion of the bore. FIG. 2C illustrates a final configuration of the secured insert 21 and presents a diagrammatic representation of the resultant lateral retention forces between the sidewalls of the insert 21 and the electrode body 22. The initial clearance between the open end portion of the bore and the insert results in the formation of a radial bulge deeper in the bore than in the prior art case illustrated in FIG. 1C, because of the absence of surface friction at said open end. As a consequence, the retention forces are greatest near the step surface 26, which are advantageously located away from the exposed portion 24 of the insert 21 to which the plasma arc attaches during torch operation. Thus, this portion of greatest retention strength is kept cooler and is less prone to erosion.

Figure 2D:
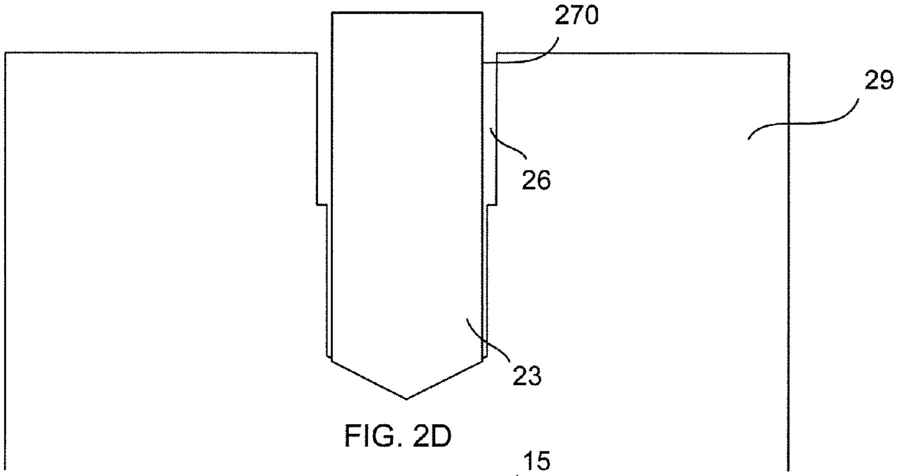
FIGS. 2D-2F are partial cross-sectional views of a plasma arc torch electrode configuration illustrating intermediate steps of a method for securing an insert into an electrode bore incorporating principles of the present invention.
Figure 2E:
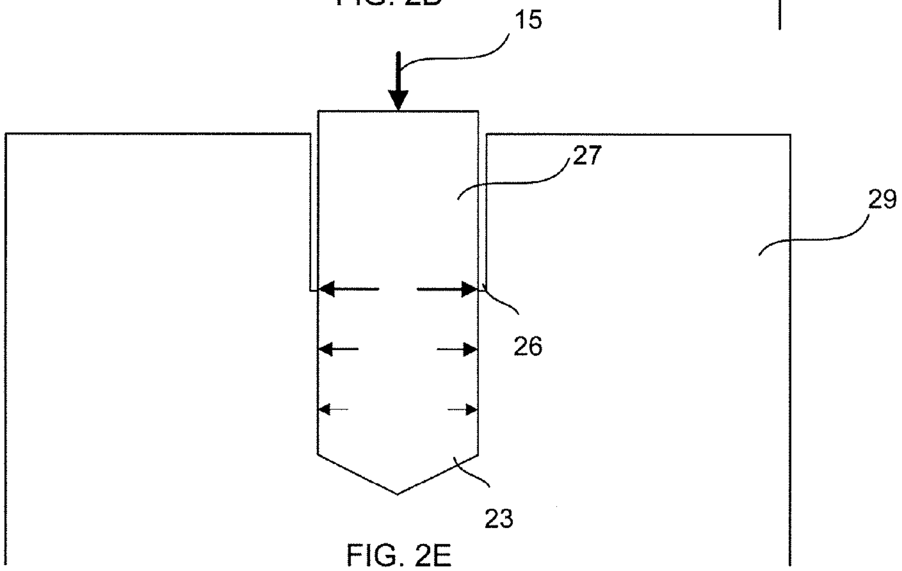
Figure 2F:
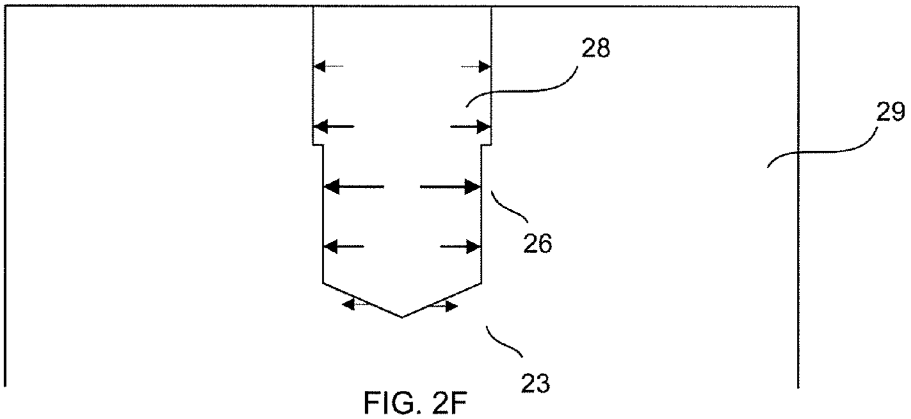

FIGS. 2D-2F illustrate another embodiment of the invention, somewhat similar to those illustrated in FIGS. 2A-2C, except that the closed end surface 23 of the bore can include a tapered depression, e.g., formed by a drill point, with which the contact end of the insert 27 can be configured to mate. The end surface 23 of the bore can have other configurations as well, which mate with a contact end of an insert in accordance with principles of the present invention. Similar principles can also be used with a through-hole configuration, in which case an inner open end would replace the closed end surface 23 in the representation in FIGS. 2D-2F.

Figure 3A:
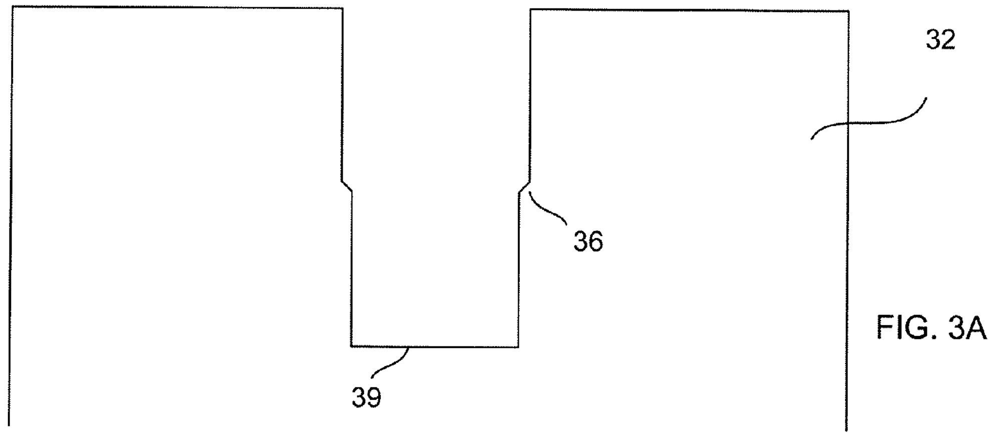
FIGS. 3A-3C are partial cross-sectional views of different plasma arc torch electrode bore configurations.
Figure 3B:
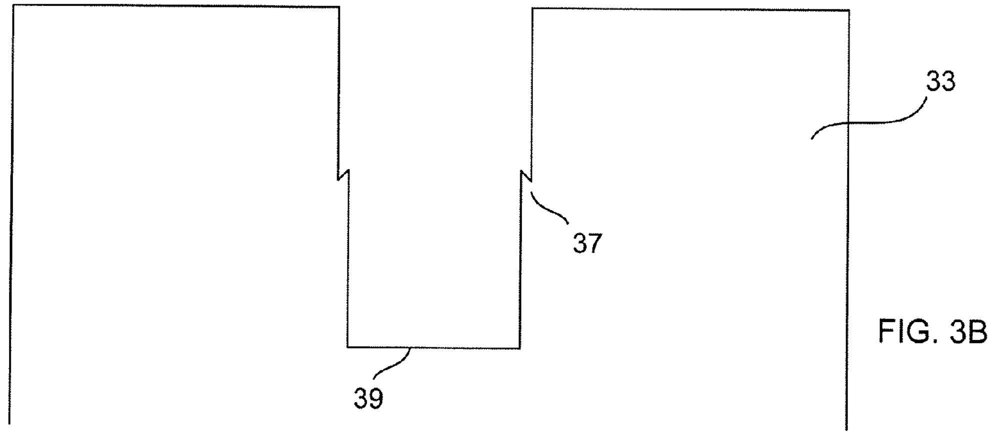
Figure 3C:
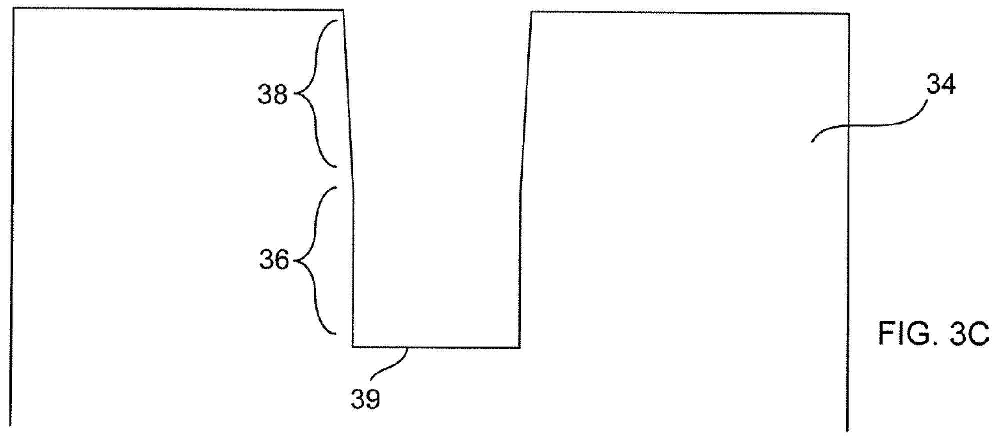

FIGS. 3A-3C are partial cross-sectional illustrations of embodiments of a plasma arc torch electrode bore configuration. More specifically, FIG. 3A illustrates an electrode body 32 comprising a bore with two substantially cylindrical portions, wherein the portion defining the closed end has a smaller diameter than the portion defining the open end of the electrode body 32. A frustoconical surface step 36 is illustrated between the two cylindrical portions and can be located anywhere along the length of the bore. FIG. 3B illustrates an electrode body 33 comprising a bore with two substantially cylindrical portions, wherein the portion defining the closed end has a smaller diameter than the portion defining the open end of the electrode body 33. A surface projection 37 can be located between the two cylindrical portions, and can be located anywhere along the length of the bore. The surface projection can be one or more barbs, possibly at different longitudinal depths, or an annular projection. FIG. 3C illustrates an electrode body 34 comprising a bore with a substantially cylindrical portion 36 defining a closed end and a frustoconical portion 38 defining the open end. A bore with the opposite configuration, i.e., a frustoconical portion defining a closed end and a cylindrical portion defining an open end, can be provided as another embodiment or configuration. The electrode embodiments illustrated in FIGS. 3A-3C can each have a gap, as illustrated in FIG. 2A, with respect to an insert when the insert is initially pressed into the bore. Thus, a radial bulge can be formed away from the open end of the bore, resulting in the retention forces being greatest around this bulge and the insert being secured in the electrode body. The end surfaces 39 of the bore can be planar surfaces, but they can have other configurations as well, e.g., a tapered depression, which can mate with a contact end of an insert. Similar principles can also be used in a through-hole configuration, in which case an inner open end would be replace the closed end surface 39 in the representation in FIGS. 3A-3C.

Figure 4A:
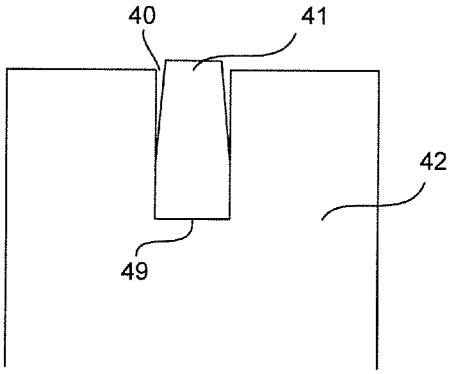
FIGS. 4A-4D are partial cross-sectional views of plasma arc torch electrode and insert configurations.
Figure 4B:
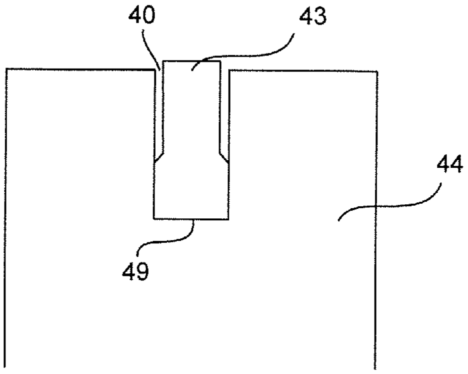
Figure 4C:
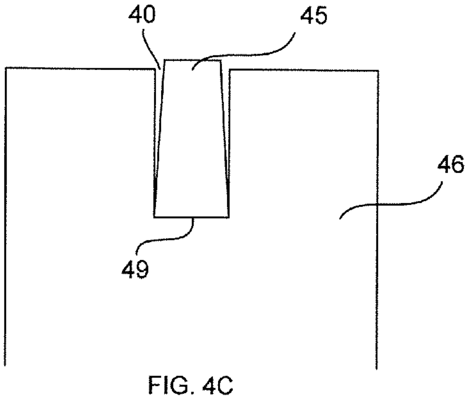
Figure 4D:
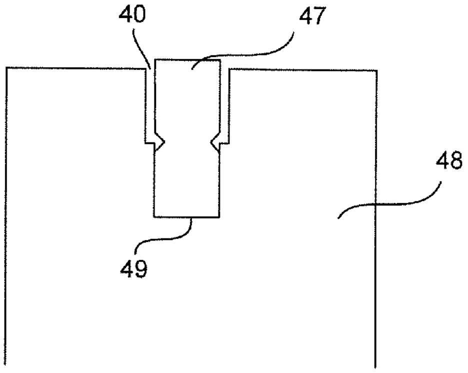

FIGS. 4A-4D are partial cross-sectional illustrations of intermediate plasma arc torch electrode and insert configurations. FIG. 4A illustrates an electrode body 42 comprising a substantially cylindrical bore. The insert can include a substantially cylindrical contact end 49 and an elongated frustoconical exposed end 41. FIG. 4B illustrates an electrode body 44 comprising a substantially cylindrical bore. The insert 43 can include two substantially cylindrical portions and a frustoconical portion located between the two other portions, wherein the contact end portion of the insert 43 has a larger diameter than the exterior end portion of the insert 43. FIG. 4C illustrates another embodiment including an electrode body 46 comprising a substantially cylindrical bore. The insert can include an elongated frustoconical body, wherein a contact end 49 has a larger diameter than an exterior end 45. FIG. 4D illustrates an electrode body 48 comprising a bore, which can include two substantially cylindrical portions similar to electrode 22 of FIG. 2A. The insert 47 can include two substantially cylindrical portions with an annular notch located between the two portions. The notch can be formed around the insert to align with a step in the bore of the electrode body 48. The electrode and insert embodiments illustrated in FIGS. 4A-4D each have a gap 40 when the insert is initially pressed into the bore. Thus, a radial bulge can form away from an open end of the bore, causing the retention force to be greatest around this bulge, thereby securing the insert in the electrode body. The end surfaces 49 of the bore can be planar surfaces, but they can have other configurations as well, e.g., a tapered depression, which mate with a contact end of an insert. Similar principles can also be used in a through-hole configuration, in which case an inner open end would replace the closed end surface 49 in the representation in FIGS. 4A-4D. The electrodes 42, 44, 46, and 48 comprise cylindrical bores, but they can have other configurations as well, e.g., the electrode configurations 22, 32, 33, and 34, in accordance with principles of the present invention.

The bore and insert diameters, lengths, and tapers illustrated in FIGS. 3A-3C and 4A-4D can all be modified, e.g., the tapers could be straight, convex or concave, and they can have multiple steps or tapers in combination, all in accordance with principles of the present invention.

Figure 5A:
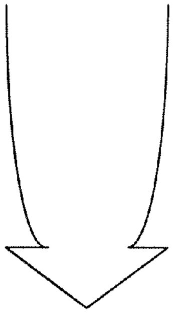
FIGS. 5A-5F are partial cross-sectional views of plasma arc torch insert configurations.
Figure 5B:
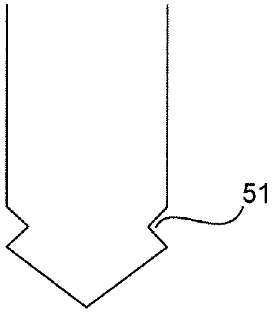
Figure 5C:
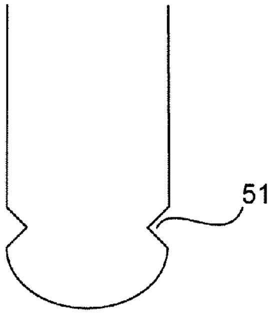
Figure 5D:
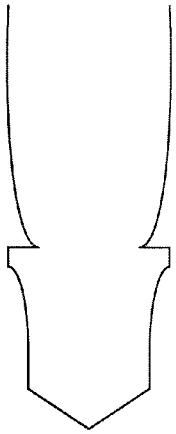
Figure 5E:
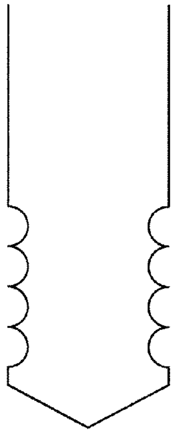
Figure 5F:
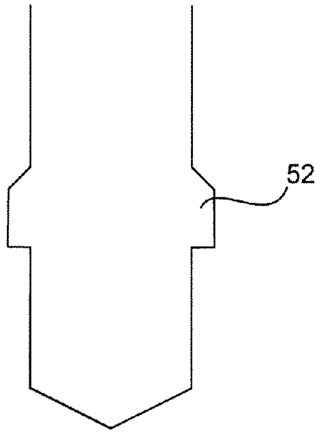

FIGS. 5A-5F are partial cross-sectional illustrations of embodiments of a plasma arc torch insert configuration in accordance with embodiments of the invention. FIG. 5A illustrates an insert with a notched head and an elongated taper lead out. FIG. 5B illustrates an insert with a notched or grooved 51 head. FIG. 5C illustrates an insert with a notched or grooved 51 head and a spherical end surface. FIG. 5D illustrates an insert with a notched head and with a smaller diameter lower cylindrical portion. FIG. 5E illustrates an insert with multiple notches or grooves. FIG. 5F illustrates an insert with an external projection 52 that can mate with a surface of an electrode bore, e.g., step surface 26. Each of these insert configurations can be used with, e.g., the various bore configurations of the invention. Although FIGS. 5A-5E illustrate annular notches or grooves on an insert, they can also have notches or grooves that are not annular, e.g., one or more barbs, which can be located at different longitudinal positions. The surface roughness of the insert and/or the bore can also be configured to provide a roughness to enhance insert retention. For example, small grooves in the surfaces of the bore and/or insert, or even threadlike patterns, can be used to enhance surface retention. In addition, all insert contact surface geometries, e.g., planar, spherical, conical end surfaces, can be used with any of the insert configurations illustrated in FIGS. 5A-5F, or their respective through-hole configurations, in accordance with principles of the present invention.

Figure 6A:
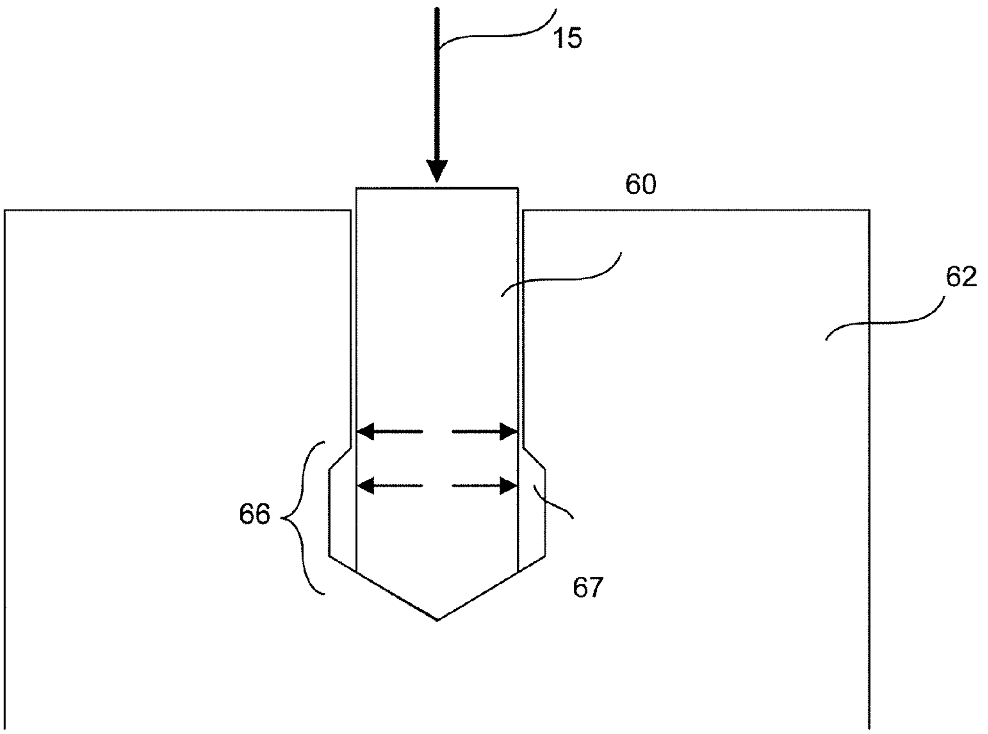
FIG. 6A is a partial cross-sectional view of a plasma arc torch electrode configuration illustrating a method for securing an insert into an electrode bore.
Figure 6B:
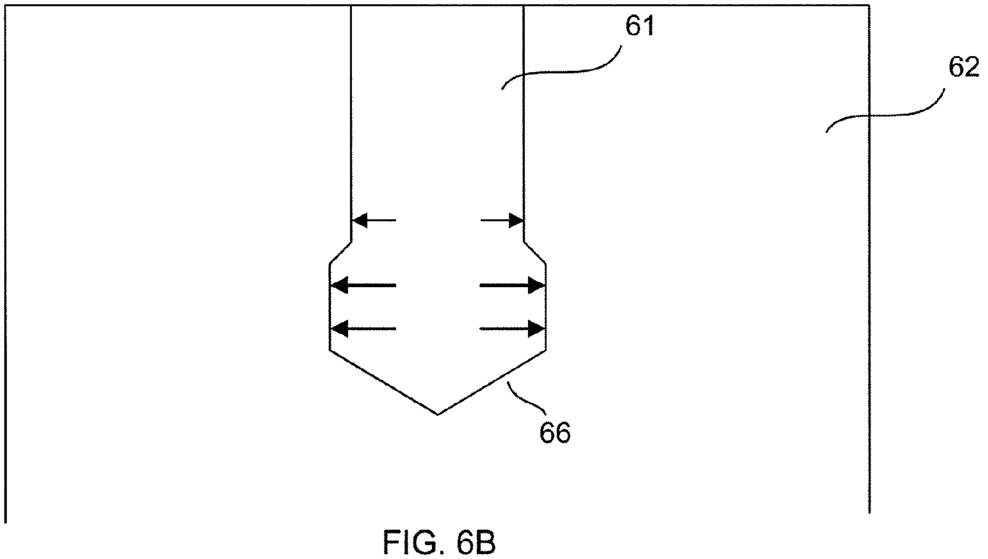
FIG. 6B is a partial cross-sectional view of a plasma arc torch electrode configuration comprising an insert secured in the electrode bore.
Figure 6C:
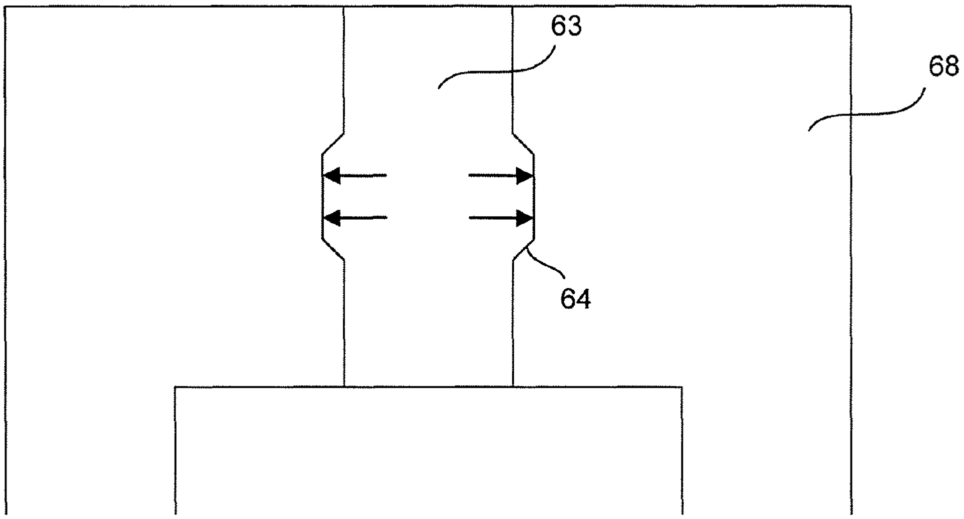
FIG. 6C is a partial cross-sectional view of a plasma arc torch electrode configuration comprising an insert secured in the electrode bore with a through-hole configuration.

FIGS. 6A-6B illustrate another embodiment of a method and apparatus for securing an insert into an electrode bore, and the resulting electrode configuration. The electrode body 62 comprises a bore in which an insert is to be secured. The bore can include two portions, wherein the portion defining a closed end 66 has a diameter greater than a portion defining an open end of the bore. A substantially cylindrical insert 60 with a diameter slightly less than the diameter of the open end portion of the bore is illustrated. FIG. 6A illustrates an intermediate configuration of the electrode after the insert 60 has been pressed 15 into the closed end portion of the bore and presents a diagrammatic representation of the initial resultant lateral forces present in the insert 60. Before insertion of the insert, the gap 67 between the insert 60 and the electrode body 62 is greater for the closed-end portion than the gap 69 for the open-end portion. In situations where the diameter of the insert is formed to be virtually indistinguishable from the diameter of the open-end portion of the bore, a gap between the insert and the bore around this portion can be small or nonexistent. The applied pressure 15 can force the insert 60 to expand, where it is unrestrained, into the larger diameter closed end portion 66 of the bore. FIG. 6B illustrates a final configuration of a secured insert 61 and presents a diagrammatic representation of the resultant lateral retention forces between the sidewalls of the insert 61 and the electrode body 62. The absence of a side surface in the closed end portion 66 allows the insert to expand into this space, resulting, even when the insert expands only partially, in the retention forces being greatest in this portion of the electrode body 62. The location of these forces at this position in the electrode are advantageously located away from the exposed portion of the insert 21 to which the plasma arc attaches during torch operation. Thus, this portion of greatest retention strength is less affected by the plasma arc and is cooler and less prone to erosion. As described below, the end surface of the bore can be a tapered depression, but other configurations can also be used, e.g., a planar surface, which can mate with a contact end of an insert. FIG. 6C illustrates another configuration of a secured insert 63 in an electrode with a through-hole configuration, inserted and secured in a similar fashion as illustrated in FIGS. 6A-6B. The absence of a side surface in the central portion 64 allows the insert to expand at this depth, resulting in increased retention forces at this portion of the electrode body 68.

Figure 7:
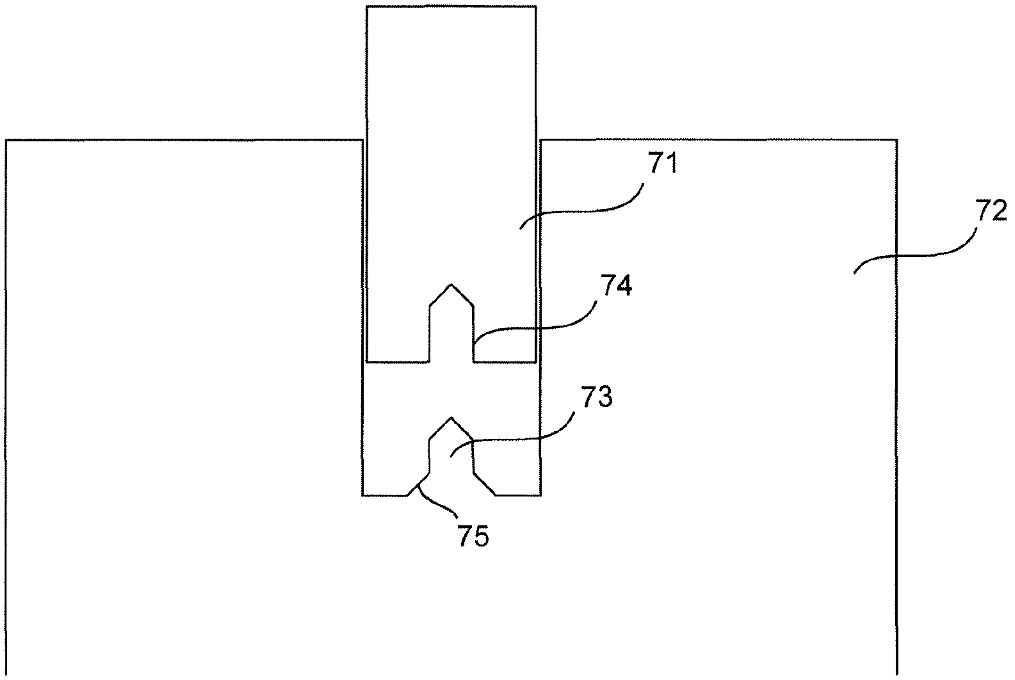
FIG. 7 is another partial cross-sectional view of a plasma arc torch electrode and insert configuration comprising a projection in the bore of the electrode.

FIG. 7 is a partial cross-sectional view of another embodiment of an intermediate plasma arc torch electrode and insert configuration. The electrode body 72 comprises a bore in which an insert is to be secured. The bore can include a cylindrical portion and a projection 73, e.g., disposed on the closed end surface of the bore. A cylindrical insert 71 with a diameter slightly less than the diameter of the bore is provided. A contact end of the insert 71 comprises a bore 74. The bore 74 of the insert 71 can be configured to mate with a projection 73 of the electrode bore such that before the insert 71 can be completely pressed flush with the bore of the electrode body 72, a surface 75 of the projection can contact the insert 71. Upon an applied pressure, the imperfect matching of the insert 71 and the electrode body 72 configurations can force the insert 71 to expand outwardly into the electrode body 72, resulting in increased retention forces at this portion of the electrode body 72. The location of these forces at this position in the electrode are advantageously located away from the exposed portion of the insert 71 to which the plasma arc attaches during torch operation. Thus, this portion of the insert experiences increased retention strength, is kept cooler, and is less prone to erosion. The projection in this embodiment can be centered and symmetric about a center axis of the electrode body, but other configurations can also be used, e.g., a tapered wall aligned along a diameter of the bore, or one or more tapered projections emanating from the walls of the bore, in accordance with principles of the present invention.

Figure 8:
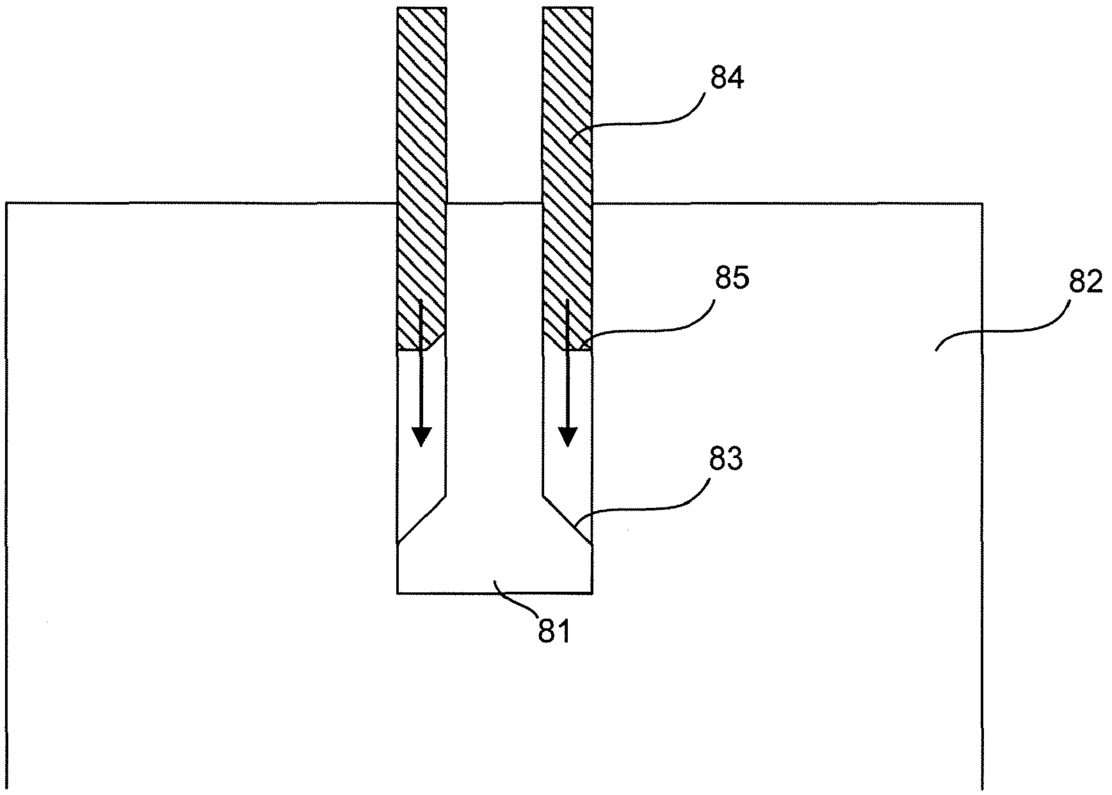
FIG. 8 is a partial cross-sectional view of a plasma arc torch electrode and insert configuration comprising an insert sleeve.

FIG. 8 is a partial cross-sectional view of an intermediate plasma arc torch electrode and insert configuration. The electrode body 82 comprises a cylindrical bore in which an insert is to be secured. The insert 81 can include two substantially cylindrical portions and a frustoconical portion 83 illustrated between the two other portions, similar to insert 43, wherein a contact end portion of the insert 81 has a larger diameter than an exterior end portion of the insert 81. A sleeve 84 is provided and can be configured for insertion between the insert 81 and the bore of the electrode body 82. The sleeve 84 can include a contact end 85 configured to mate with the frustoconical portion 83 such that as the sleeve 84 is pressed into the insert 81, the surface 83 of the insert 81 contacts the contact end 85. Upon an applied pressure, the imperfect matching of the insert 81 and the sleeve 84 configurations force the sleeve 84 to expand outwardly into the electrode body 82, resulting in an increase in the retention forces at this portion of the electrode body 82 and, in effect, "crimping" or securing the insert 81 into the bore of the electrode body 82. The location of these forces at this depth are advantageously located away from the exposed portion of the insert 81 to which the plasma arc is attaches during torch operation. Thus, this portion of increased retention force is kept cooler and is less prone to erosion. The sleeve can be formed of a high emissivity material, e.g., hafnium or zirconium, or of a high thermal conductivity material, e.g., copper, a copper alloy, or silver. The sleeve and the insert can be of different materials. For example, the insert can be hafnium and the sleeve can be silver, or the insert can be silver and the sleeve can be hafnium. The end surface of the bore can be a planar surface, but can have other configurations as well, e.g., a tapered depression, which mate with a contact end of an insert. Similar principles can also be used with a through-hole electrode configuration, in which case the closed end surface represented in FIG. 8 would be replaced with an inner open end. Preferably, before a sleeve is used to secure the insert in the bore, the insert can be supported by an anvil or mandrel at the inner open end of the electrode body.

Figure 9:
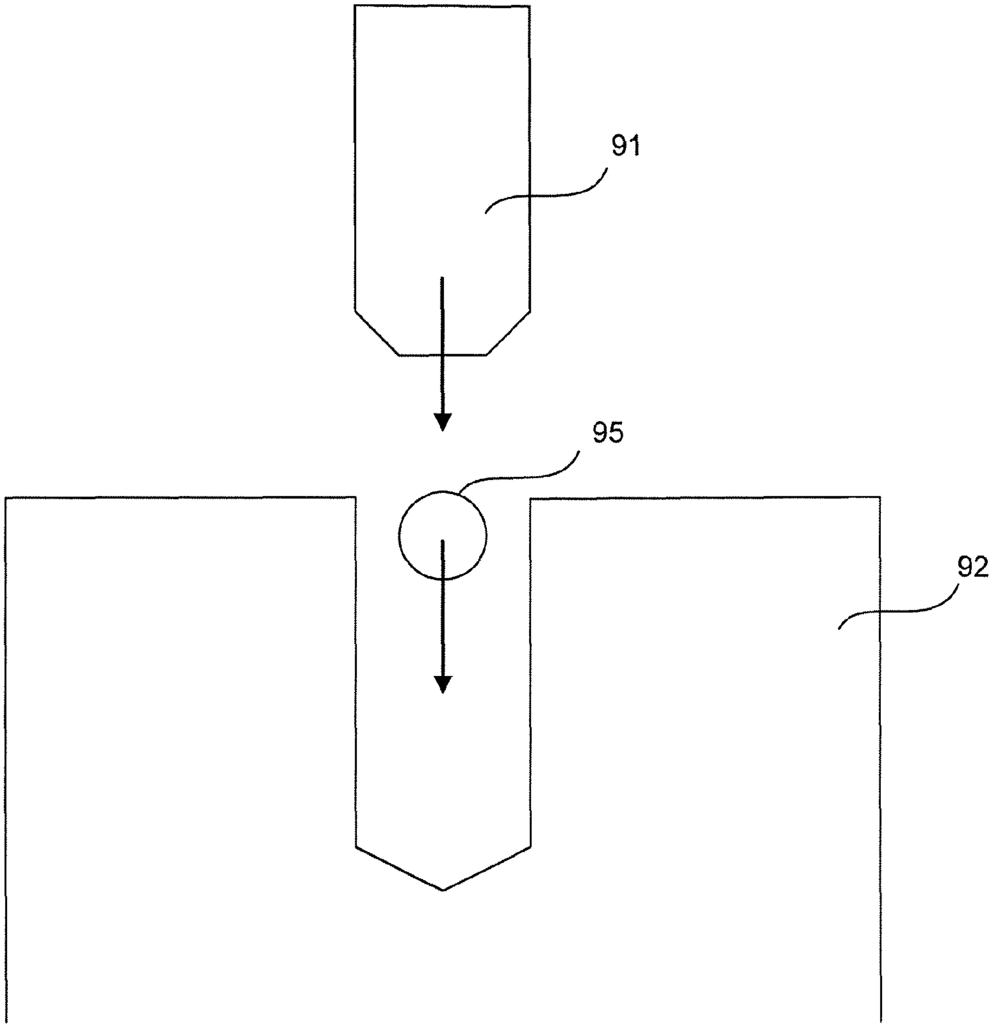
FIG. 9 is a partial cross-sectional view of plasma arc torch electrode and insert configuration comprising an insert ball.

FIG. 9 is a partial cross-sectional view of an embodiment of an intermediate plasma arc torch electrode and insert configuration comprising an insert object, e.g., a spherical object. The electrode body 92 comprises a cylindrical bore. A substantially cylindrical insert 91 with a diameter slightly less than the diameter of the bore is provided. A ball 95 can be placed into the bore of the electrode body 92 prior to the insertion of the insert 91. The ball 95 can be formed of a material, e.g., steel, which is harder than the material of the insert. Upon insertion of the insert 91 into the bore, the hard surface of the ball 95 can cause a contact end of the insert 91 to expand outwardly, thereby securing the insert in the bore of the electrode body 92. The ball 95 thus can perform a function similar to the projection 73 illustrated in FIG. 7. Of course, other configurations can be used, e.g., a preformed indentation can be formed at the bottom of the insert, square shavings can be placed in the bore, and/or one or more other shapes/objects in place of the ball 95.

Figure 10:
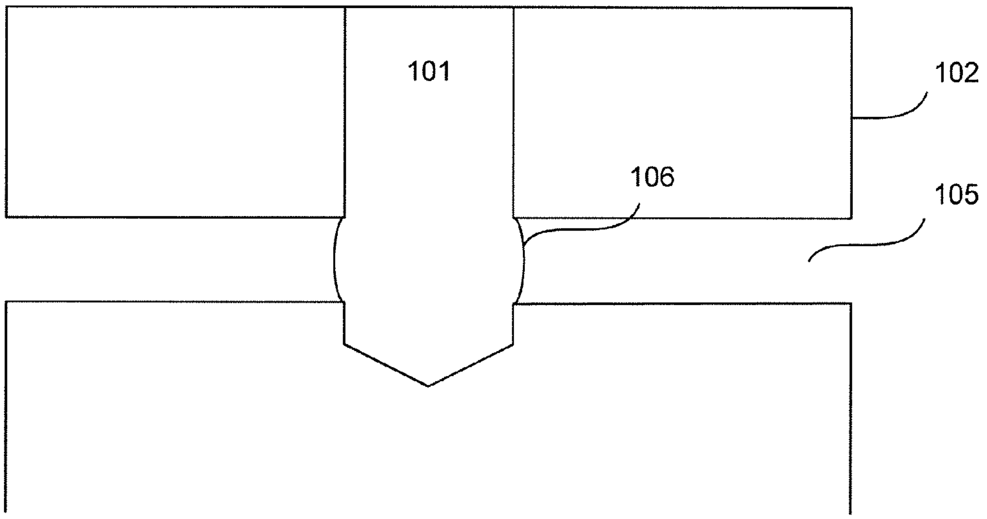
FIG. 10 is a partial cross-sectional view of plasma arc torch electrode and insert configuration comprising a cross-drilled hole.

FIG. 10 is a partial cross-sectional view of plasma arc torch electrode and insert configuration comprising a cross-drilled hole. The electrode body 102 can include a cross-drilled hole 105, which can cross paths with a cylindrical bore. In some embodiments, the cross-drilled hole is formed by drilling a hole from outside of the electrode into at least a portion of the bore. The drilling operation can be terminated after the bore is reached, i.e., without extending the hole to the far side of the electrode. Of course, other configurations can be used. A substantially cylindrical insert 101 with a diameter slightly less than the diameter of the bore is provided. The cross-drilled hole 105 can provide two areas of unrestricted expansions for the insert 101, such that upon insertion of the insert 101 into the bore, the insert 101 can expand 106 into the cross-drilled hole 105. Said expansion thus can secure the insert 101 in the bore of the electrode body 102. Multiple cross-drilled holes can also be used in accordance with principles of the present invention, and these multiple holes can be at different points at different points along the longitudinal axis of the electrode, i.e., at different elevations.

Figure 11A:
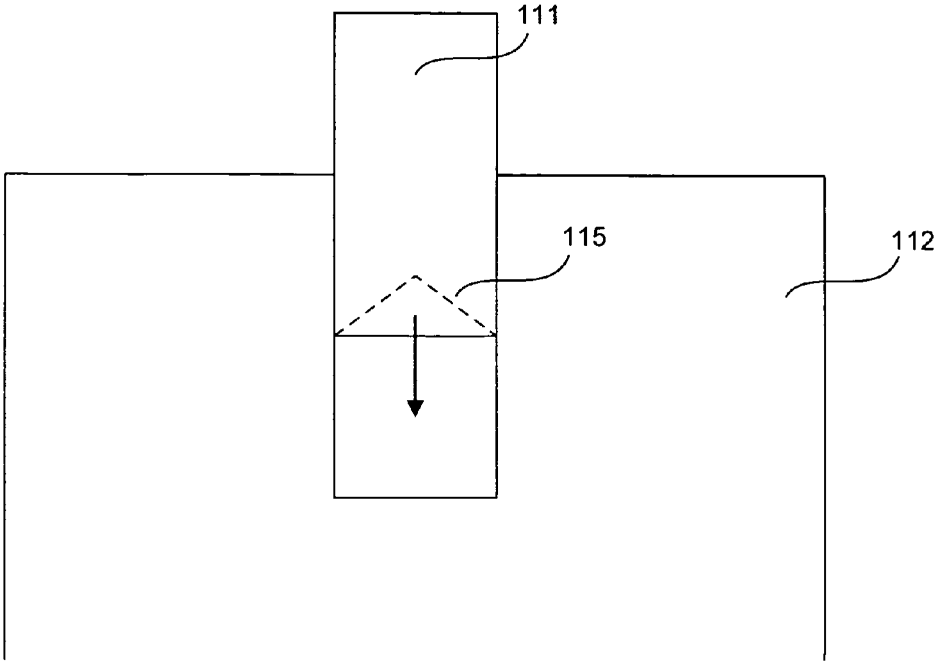
FIGS. 11A-11B are partial cross-sectional view of a plasma arc torch electrode and insert configurations.
Figure 11B:
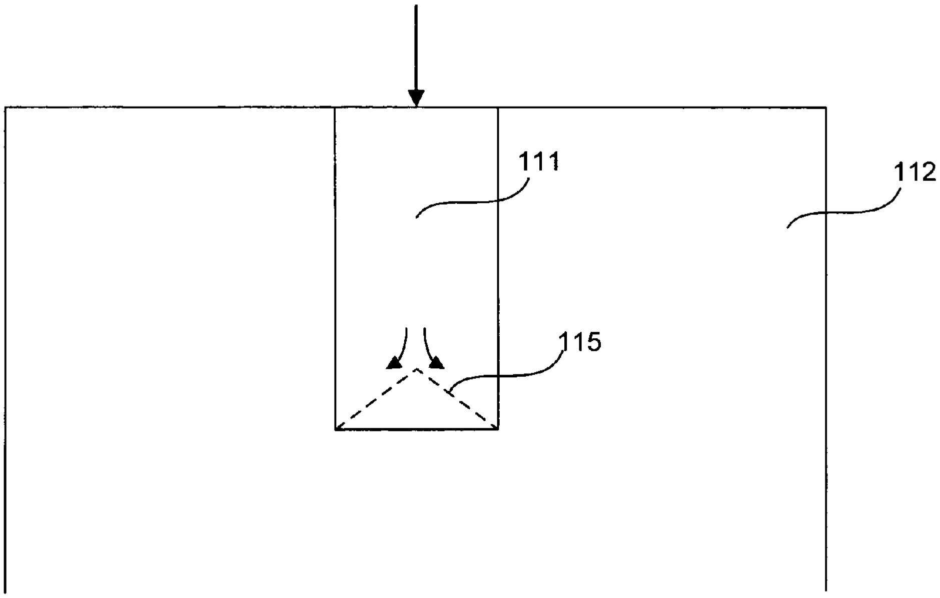

FIGS. 11A-11B are partial cross-sectional views of other embodiments of intermediate plasma arc torch electrode and insert configurations. The electrode body 112 comprises a cylindrical bore in which an insert is to be secured. A substantially cylindrical insert 111 with a diameter slightly less than the diameter of the bore is provided. The contact end of the insert 111 can include a countersunk surface 115. FIG. 11A illustrates an intermediate configuration of the electrode as the insert 111 is being pressed into the bore. FIG. 11B illustrates a second intermediate configuration of the electrode as the insert 111 is pressed against the end surface of the bore. The contact end of the insert, as a result, expands into the bore, securing the insert. As a consequence, the retention forces can be increased near the end surface of the bore, which is advantageously located away from the exposed portion of the insert 111 to which the plasma arc attaches during torch operation. Thus, this portion of increased retention strength is kept cooler and is less prone to erosion.

Figure 12A:
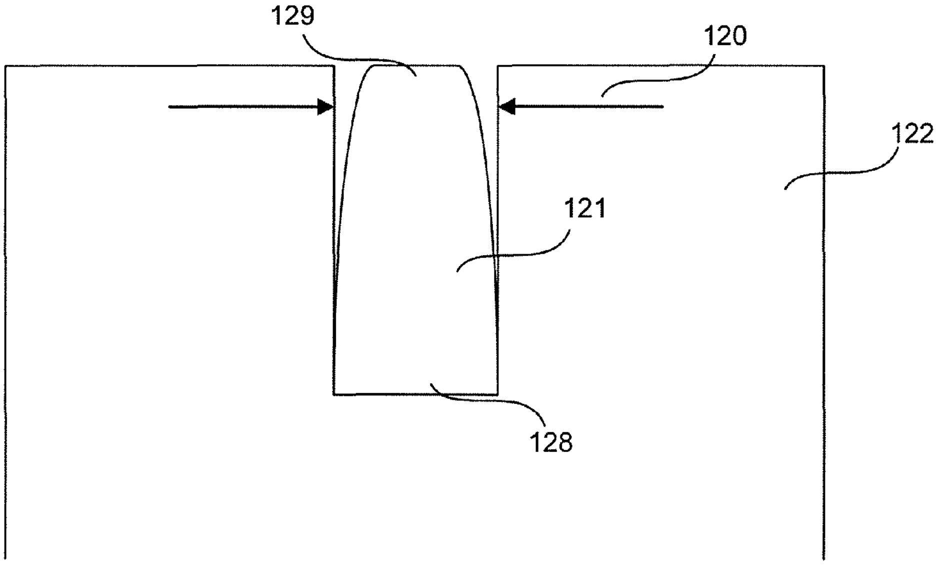
FIG. 12A is a partial cross-sectional view of a plasma arc torch electrode configuration illustrating a method for securing an insert into an electrode bore.
Figure 12B:
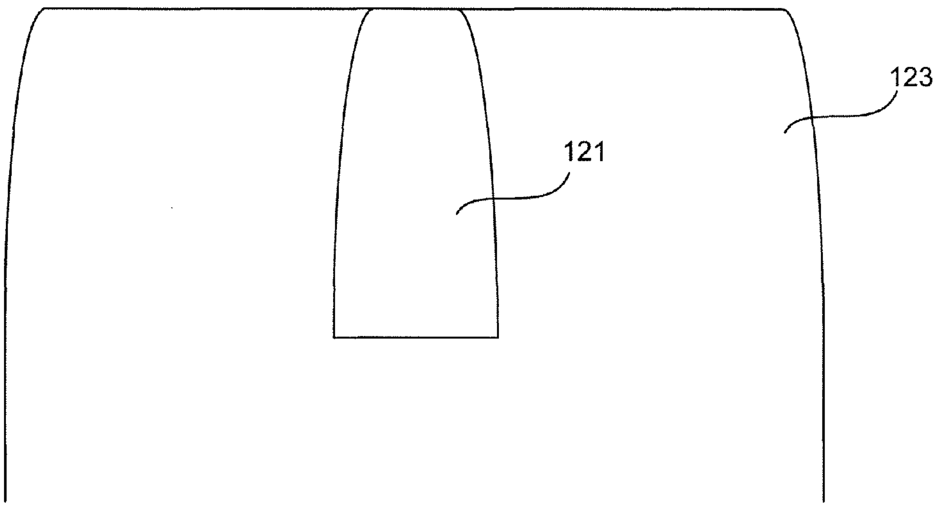
FIG. 12B is a partial cross-sectional view of a plasma arc torch electrode configuration having an insert secured in an electrode bore according to the method of FIG. 12A.

FIGS. 12A-12B illustrate a method for securing an insert into an electrode bore, and the resulting electrode configuration. The electrode body 122 comprises a cylindrical bore in which an insert is to be secured. An elongated tapered insert 120 is provided, wherein a contact end 128 can have a larger diameter than the exterior end 129. FIG. 12A illustrates an intermediate configuration of the electrode after the insert 120 has been pressed into the closed end portion of the bore. It also presents a diagrammatic representation of lateral forces 120 applied on and around an end portion of the electrode body to secure the insert. These forces can be applied to an external surface of the electrode body. The resulting forces 120 are directed radially inwards and can force the electrode body 122 to at least partially conform to the insert 121. FIG. 12B illustrates a final configuration of the secured insert 121 in the electrode body 123. In this manner, the hoop strength at the compressed end of the electrode body 123 secures the insert 121.

Figure 13:
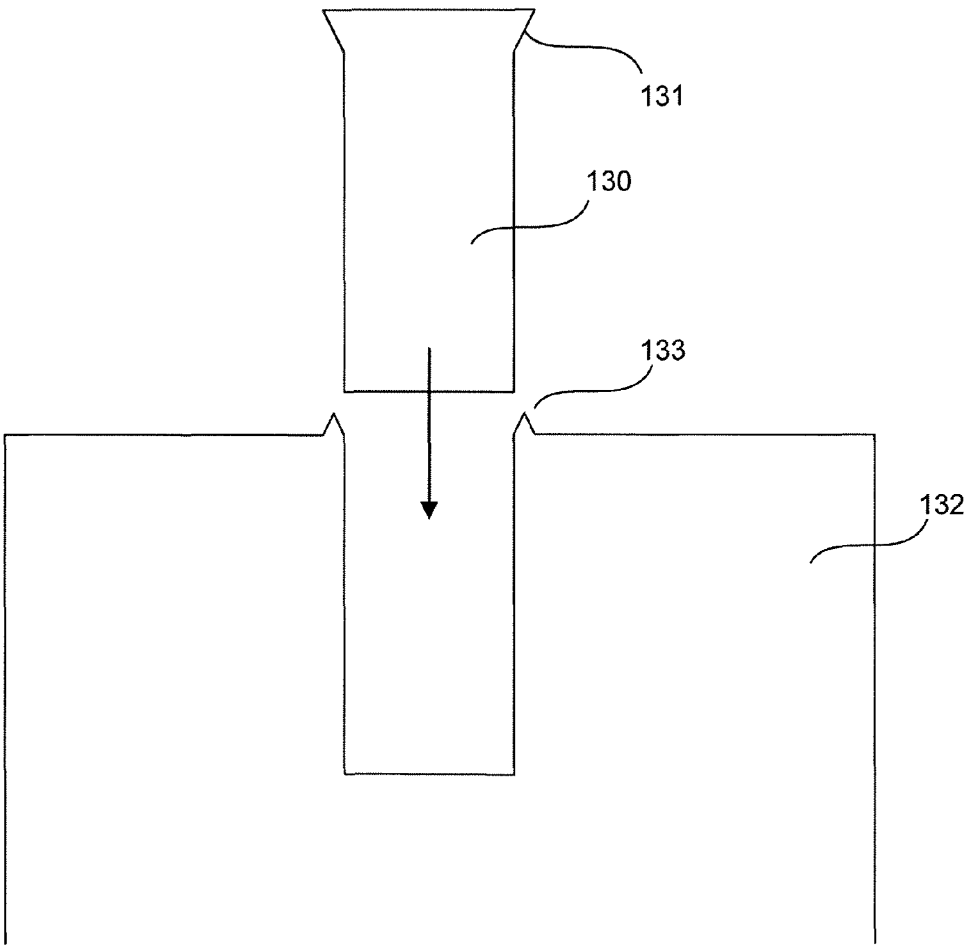
FIG. 13 is a partial cross-sectional view of a plasma arc torch electrode configuration comprising an annular lip and an insert configuration comprising a flared head configuration.

FIG. 13 is a partial cross-sectional view of an intermediate plasma arc torch electrode and insert configuration. The electrode body 132 comprises a cylindrical bore. The bore can include an annular extension 133 around the open end of the bore. A cylindrical insert 130 with a flared head 131 is provided. Inserts can be sized to allow the insert to fit into the bore leaving enough insert material extending out of the bore to overfill the hole when pressed. The flared head 131 of the insert 130 can be a different configuration for providing additional insert material. The flared head 131 can also ensure that after the insert 130 has been press fit into the bore of the electrode body 132 no air gap exists around the exposed end of the insert 130 between the insert and the side walls of the bore, which can degrade the thermal cooling of the electrode insert. The annular extension 133 in this embodiment can be uniformly symmetric about a center axis of the electrode body, but other configurations can also be used, e.g., a non-uniform extension, or series of extensions surrounding the open end of the bore, in accordance with principles of the present invention. While the electrode illustrated in FIG. 13 is one particular embodiment, the extension 133 can be used with other electrode embodiments, e.g., electrodes 22, 29, 32, 33, 34, 42, 44, 46, 48, 62, 68, 72, 92, and 112 of FIGS. 2A, 2D, 3A-3C, 4A-4D, 6A, 6C, 7, 9, and 11A, in accordance with principles of the present invention. The extension 133 can be used with inserts that do or do not include a flared head 131.

Figure 14A:
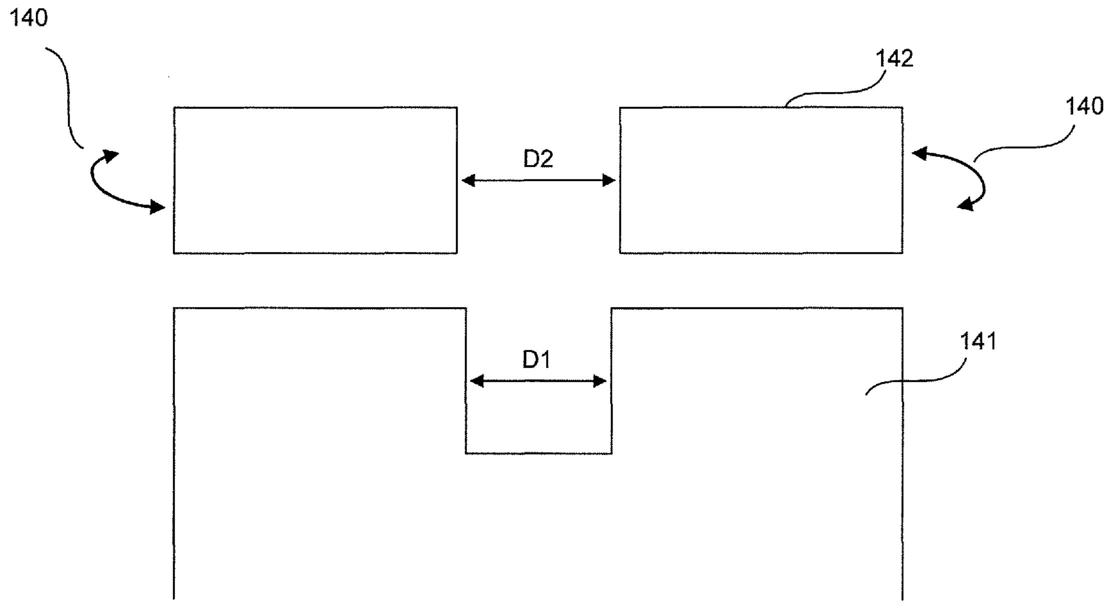
FIGS. 14A-14B are partial cross-sectional views illustrating a method of forming an electrode incorporating principles of the present invention.
Figure 14B:
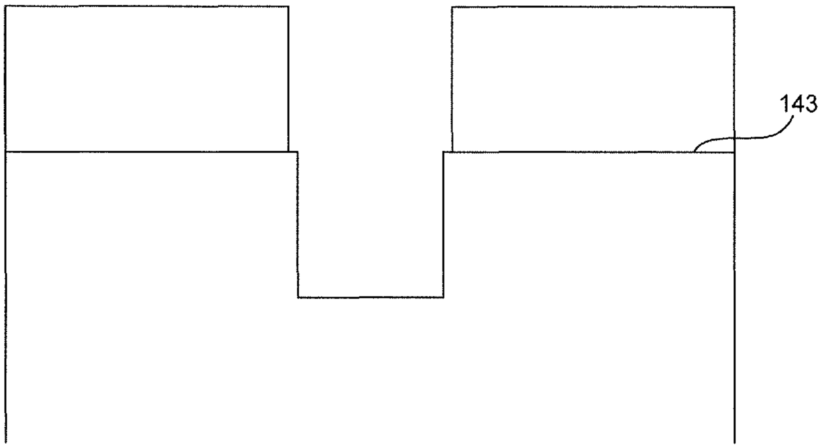

FIGS. 14A-14B are partial cross-sectional views illustrating a method of forming an electrode incorporating principles of the present invention. A first portion 141 of the electrode body can be provided with a closed-ended cylindrical bore having a first diameter D1. A second portion 142 of the electrode body can be provided with an open-ended cylindrical bore having a second diameter D2 greater than the first diameter. FIG. 14A illustrates a method of solid state welding, e.g., friction welding 140 the second portion 142 to the first portion 141. In another embodiment, the diameter D1 of the first portion 141 is greater than the diameter D2 of the second portion 142. FIG. 14B illustrates a final configuration of the electrode body of FIG. 14A wherein the surfaces 143 can secure the first portion 141 to the second portion 142 as a result of solid state welding (e.g., friction welding) the surfaces of the two portions 141 and 142. The first and second portions can be formed of a high thermal conductivity material, such as copper, copper alloy, or silver. The second portion can be formed from the same or different material from that of the first portion. While the electrode illustrated in FIG. 14B is one particular embodiment, the same method can be used to form other electrode embodiments, e.g., electrodes 29, 32, 33, 34, 62, and 72 of FIGS. 2D, 3A-3C, 6A, and 7, in accordance with principles of the present invention. Similar principles as those illustrated in FIGS. 12A-12B, 13, and 14A-14B can also be used in respective or combined through-hole configurations, in which case an open end surface would be replace the closed end surface of the electrode body illustrated.

Figure 15A:
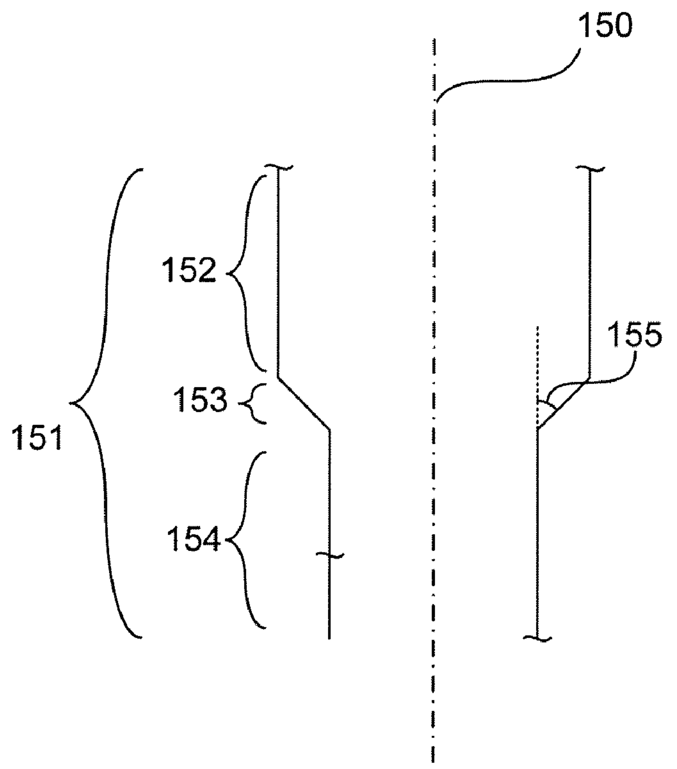
FIGS. 15A-15B are partial cross-sectional views illustrating central portions of inserts disposed in electrodes.
Figure 15B:
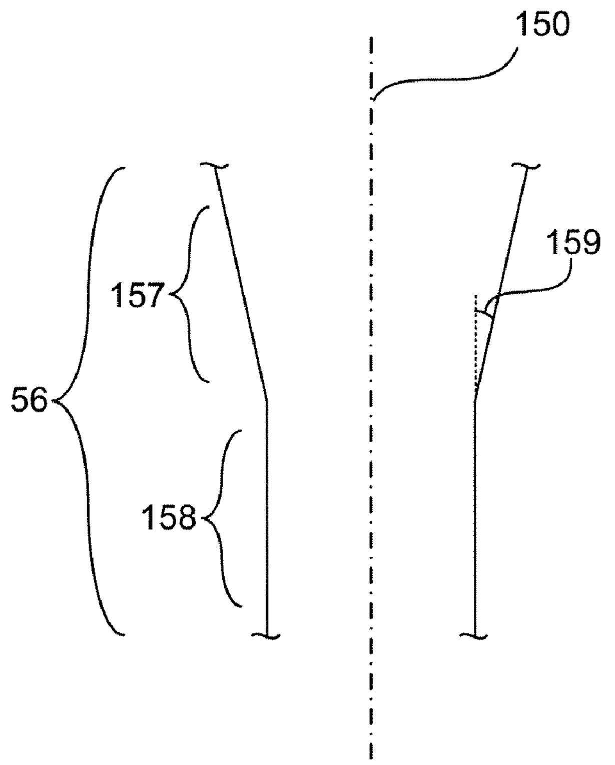

FIGS. 15A-15B are partial cross-sectional views illustrating central portions of inserts disposed in electrodes. FIG. 15A illustrates a final configuration of a central portion of an insert 151 secured in an electrode body (not shown). The central portion of the insert 151 can have a longitudinal length of no less than about 70% of the longitudinal length of the insert. The central portion of the insert 151 can include a first portion 152, a second portion 153, and a third portion 154. The first portion 152, second portion 153, and third portion 154 can each define an angle relative to the longitudinal axis 150 of the insert and a tangent to their respective exterior surfaces. For example, as illustrated in FIG. 15A, the angle 155 defined between the longitudinal axis 150 and a tangent to an exterior surface of the second portion 153 is greater than 0 degrees. Likewise, the angle defined between the longitudinal axis 150 and a tangent to an exterior surface of either the first portion 152 or the third portion 154 is zero, because the first portion 152 and the third portion 154 are cylindrical.

FIG. 15B illustrates a different final configuration of a central portion of an insert 156 secured in an electrode body (not shown). The central portion of the insert 156 can include a first portion 157, and a second portion 158. The first portion 157, and second portion 158 can each define an angle relative to the longitudinal axis 150 of the insert and a tangent to their respective exterior surfaces. For example, as illustrated in FIG. 15B, the angle 159 defined between the longitudinal axis 150 and a tangent to an exterior surface of the first portion 157 is greater than 0 degrees. Likewise, the angle defined between the longitudinal axis 150 and a tangent to an exterior surface of the second portion 158 is zero, because the second portion 158 is cylindrical.

In one embodiment, the angles defined by the tangents to the exterior surfaces of the insert and the longitudinal axis of the insert differ by at least 1 degree. In another embodiment, the angles defined by the tangents to the exterior surfaces of the insert and the longitudinal axis of the insert differ by at least 3 degrees. While the secured central portions of inserts 151 and 156 illustrated in FIGS. 15A and 15B are two particular embodiments, the same minimum angle differentiation between different central portions of an insert can be used with other insert embodiments, e.g., inserts 21, 28, 41, 43, 45, 47, 61, 62, 63, 71, 81, 91, 101, 111, 121, and 130, of FIGS. 2C, 2F, 4A-4D, 5A-5F, 6B, 6C, 7-11, 12B, and 13 in accordance with principles of the present invention. In other embodiments, one or more exterior surfaces of the insert can be disposed at a constant or continuously varying tangential angle relative to the longitudinal axis. The exterior surfaces can also be non-uniform, e.g., about a perimeter of a cross section of the insert.

Experimental testing during development of the present invention was undertaken using a MAX100 torch with a 100 A electrode (part number 120433), both manufactured by Hypertherm, Inc. of Hanover, N.H. All testing was done using a test stand that included a rotating copper anode as a substitute workpiece, at 100 amps of transferred current. The benchmarking of five electrodes of the known configuration produced the following results:

Average number of 20 second starts: 134.4
Standard deviation: 68.7

Two of the parts tested failed around 60 starts, e.g., from the insert falling out. The insert bore depth of these electrodes was about 0.100 inches. Parts having a new design were then tested that had a stepped hole design, similar to FIG. 2D, made by adding an outer 0.052" diameter hole to the previous 0.0449" diameter hole. Three configurations were made with these 0.052" counter-bores drilled to depths of 0.030", 0.040" and 0.050". The emissive insert used was Hypertherm part number 120437, having a 0.0445" diameter. Three parts each were tested for different counter-bores, with the results listed below:

0.030" depth
Average 20 second starts: 254.7
Standard deviation: 15.9
0.040" depth
Average 20 second starts: 213.7
Standard deviation: 37.1
0.050" depth
Average 20 second starts: 249.0
Standard deviation: 63.4

Despite the somewhat lower average number of starts for the middle test (having a counter-bore depth of 0.040"), the results of all three tests are statistically similar. All three counter-bore tests show statistically higher starts than the stock results, and each had no extremely early failures. The higher than average start counts, with one part lasting over 300 starts, indicates improved performance.

The next parts tested used the same 0.052" counter-bore, but the deeper hole (e.g., the inner hole that extended to ~0.100" in overall depth) was increased to a 0.0465" diameter. One set of parts that was tested had the 0.052" diameter counter-bore drilled to a depth of 0.030", with the smaller diameter hole drilled to a depth of 0.090". The next set of parts tested were drilled to 0.050" (larger diameter) and 0.095" (smaller diameter). The same 120437 insert described above was used, producing the following results based on three samples each.

0.030" depth
Average 20 second starts: 181.7
Standard deviation: 12.2
0.050" depth
Average 20 second starts: 240.3
Standard deviation: 37.1

Next, more parts were fabricated with the same smaller hole size (0.0445") but with a counter-bore having a depth of 0.060". In these embodiments, an insert of the same size was used. Ten samples were tested under similar conditions, producing the following results:

0.060" depth
Average 20 second starts: 300.0
Standard deviation: 24.8

These parts produced over twice as many total starts as the stock configuration, and with a much lower standard deviation. The lowest number of starts achieved was 270.

Experimental results were also obtained that measured the force required to remove the insert from the electrode. These tests were first performed on new, unused parts. Measurements were then taken on electrodes that had been used for a controlled period of time. Tests were performed on stock electrodes, and electrodes having counter-bored hole depths 0.03", 0.05", and 0.06". The results of these measurements are listed below in units of pounds force.

To obtain the removal force measurement, the inside (upper) portion of the electrode was removed using a lathe and a cutting tool to expose an interior cross-sectional surface of the emissive material. A plunger/mandrel type device was then used to press the emissive material out of the surrounding copper material, in a direction towards the emissive working surface of the emissive material. The tables below indicate the amount of force exerted by the plunger to dislodge the emissive insert, in a longitudinal direction of the electrode.

TABLE 1

| | Stock New | Stock Used |
|---|---|---|
| Average | 102.9 | 51.3 |
| Std. Dev. | 9.2 | 35.6 |
| Minimum | 93 | 6 |
| Samples | 7 | 4 |

TABLE 2

| | 0.03" Step New | 0.03" Step Used | 0.05" Step New | 0.05" Step Used | 0.06" Step New | 0.06" Step Used |
|---|---|---|---|---|---|---|
| Average | 85 | 29.5 | 105 | 65 | 90.3 | 62 |
| Std. Dev. | 1.4 | 2.1 | 22.8 | 15.6 | 25.1 | 17 |
| Minimum | 84 | 28 | 79 | 54 | 62 | 45 |
| Samples | 2 | 2 | 4 | 2 | 3 | 3 |

The used parts indicated in Table 1 were run for 50, twenty second starts. These parts were not modified in accordance with principles of the invention. In every case tested, the used parts required a lower force to remove the insert. The used stock parts produced the highest standard deviation and the lowest push out force, sometimes requiring only 6 pounds of force to dislodge the emissive insert. As indicated in Table 2, the two best stepped hole designs required a minimum of 45 and 54 pounds to remove the insert. These results for the used parts were also more consistent, as indicated by the reduced standard deviation of the sample results.

Embodiments of the invention also include a method for forming an electrode body of a high thermal conductivity material. Steps of the method, as partially described above in FIGS. 2A-2F and 6A-6C, include forming the electrode body to include a first end and a second end defining a longitudinal axis. A bore is formed in the first end, such that the bore includes a first portion and a second portion. An insert formed of a high thermionic emissivity material is positioned in the bore, wherein the insert includes a contact end and an exterior end. The contact end of the insert is aligned with the second portion of the bore, and the exterior end is aligned with the first portion of the bore, such that a first gap is established between a first exterior surface of the insert and the first portion, and a second gap is established between a second exterior surface of the insert and the second portion of the bore. The first gap is substantially greater than the second gap. A force is applied at the exterior end of the insert to secure the insert in the bore.

Embodiments of the invention also include a method for optimizing the combination of insert emissive area and insert volume, thereby reducing the cost of the insert material while maintaining a high quality emissive area.

The electrode body in each embodiment described or illustrated herein can be formed from a high thermal conductivity material, e.g., copper, a copper alloy, or silver. It is also to be understood that each electrode body embodiment also represents the situation in which the bore illustrated is formed in a sleeve, either before or after the sleeve can be inserted into a larger bore in the electrode body. The sleeve can be formed from a high thermal conductivity material, e.g., copper, a copper alloy, or silver, or from a high thermionic emissivity material, e.g., hafnium or any material the insert can be formed of. The insert in each embodiment described or illustrated herein can be formed from a high thermionic emissivity material, e.g., hafnium, zirconium, tungsten, thorium, lanthanum, strontium, or alloys thereof.

As seen from above, the invention provides an electrode with improved retention of an insert, thereby increasing the thermal conductivity of the interface between insert and electrode, and the efficiency and service life of the electrode. The invention also provides an electrode with an insert configuration that improves the cooling, and therefore the service life, of the insert. The invention also provides an electrode with an insert configuration that minimizes the amount of insert material required, thereby reducing the cost of the electrode while at the same time not lessening the efficiency and service life of the electrode. The invention also provides an electrode with a longer service life.

While the invention has been particularly shown and described with reference to specific preferred embodiments, it should be understood by those skilled in the art that various changes in form and detail can be made therein without departing from the spirit and scope of the invention as defined by the appended claims.

We claim:

1. An electrode for a plasma arc torch, the electrode comprising:

an electrode body formed of a high thermal conductivity material, the electrode body including a first end and a second end defining a longitudinal axis;

a bore defined by and disposed in the first end of the electrode body, the bore including a closed end and an open end, the bore defining at least a first and a second dimension each transverse to the longitudinal axis, the second dimension being closer to the closed end of the bore than the first dimension; and an insert formed of a high thermionic emissivity material disposed in the bore, the insert including an exterior end disposed near the open end of the bore and a contact end disposed near the closed end of the bore, the insert defining at least a first and a second dimension each transverse to the longitudinal axis, the second dimension being closer to the closed end of the bore than the first dimension, wherein the second dimension corresponds to an annular notch;

wherein at least one of the second dimension of the bore is greater than the first dimension of the bore, or the second dimension of the insert is greater than the first dimension of the insert.

2. The electrode of claim 1, wherein the electrode further comprises a sleeve disposed between the insert and the bore.

3. The electrode of claim 1, wherein the high thermionic emissivity material of the insert comprises hafnium or zirconium.

4. The electrode of claim 1, wherein the high thermal conductivity material of the electrode body comprises copper or a copper alloy.

5. The electrode of claim 1, wherein the electrode further comprises a silver sleeve disposed between the insert and the electrode body.

6. The electrode of claim 1, wherein a central portion of the bore comprises at least two substantially cylindrical portions.

7. The electrode of claim 1, wherein a central body portion of the insert comprises at least two substantially cylindrical portions.

8. The electrode of claim 1, wherein at least one of a central portion of the bore and a central body portion of the insert is substantially cylindrical.

9. The electrode of claim 1, wherein the bore comprises an annular extension.

10. The electrode of claim 1, wherein the insert comprises a projection disposed on a surface of the bore.

11. The electrode of claim 10, wherein the projection comprises at least one or more of a flared head, a barb, groove, notch, projection or threadlike pattern.

12. The electrode of claim 1, wherein the insert comprises at least one or more of a flared head, a barb, groove, notch, projection or threadlike pattern.

13. The electrode of claim 1, wherein the insert comprises a flared head, barbs, grooves, notches, projections or threadlike patterns.

14. An electrode for a plasma arc torch, the electrode comprising:

- an electrode body formed of a high thermal conductivity material, the electrode body including a first end and a second end defining a longitudinal axis;
- a bore defined by and disposed in the first end of the electrode body, the bore including a first portion, a second portion, and a third portion, the first portion including an outer open end of the bore, the third portion including an inner open end of the bore, the second portion of the bore defining at least a first and a second dimension each transverse to the longitudinal axis, the second dimension being closer to the third portion of the bore than the first dimension; and
- an insert formed of a high thermionic emissivity material disposed in the bore, the insert including a first portion, a second portion, and a third portion, the first portion including an exterior end disposed near the outer open end of the bore, the third portion including an end disposed near the inner open end of the bore, the insert defining at least a first and a second dimension each transverse to the longitudinal axis, the second dimension being closer to the third portion of the insert than the first dimension, wherein the second dimension corresponds to an annular notch;
- wherein at least one of
  - the second dimension of the bore is greater than the first dimension of the bore, or
  - the second dimension of the insert is greater than the first dimension of the insert.

15. The electrode of claim 14, wherein the high thermionic emissivity material of the insert comprises hafnium or zirconium.

16. The electrode of claim 14, wherein the high thermal conductivity material of the electrode body comprises copper or a copper alloy.

17. The electrode of claim 14, wherein the electrode further comprises a silver sleeve disposed between the insert and the electrode body.

18. The electrode of claim 14, wherein a central portion of the bore comprises at least two substantially cylindrical portions.

19. The electrode of claim 14, wherein a central body portion of the insert comprises at least two substantially cylindrical portions.

20. The electrode of claim 14, wherein at least one of a central portion of the bore and a central body portion of the insert is substantially cylindrical.

21. The electrode of claim 14, wherein the bore comprises an annular extension.

22. The electrode of claim 14, wherein the insert comprises a projection disposed on a surface of the bore.

23. The electrode of claim 22, wherein the projection comprises at least one or more of a flared head, a barb, groove, notch, projection or threadlike pattern.

24. The electrode of claim 14, wherein the insert comprises at least one or more of a flared head, a barb, groove, notch, projection or threadlike pattern.

25. The electrode of claim 14, wherein the insert comprises a flared head, barbs, grooves, notches, projections or threadlike patterns.

26. An electrode for a plasma arc torch, the electrode comprising:

- an electrode body formed of a high thermal conductivity material, the electrode body including a first end and a second end defining a longitudinal axis;
- a bore defined by and disposed in the first end of the electrode body, the bore including a first end and a second end, the first end of the bore including an open end of the bore; and
- an insert formed of a high thermionic emissivity material and disposed in the bore, the insert having a longitudinal length and including:
  - a first end portion including an exterior end surface disposed near the open end of the bore, a longitudinal length of the first end portion being no more than about 10% of the longitudinal length of the insert;
  - a second end portion, a longitudinal length of the second end portion being no more than about 20% of the longitudinal length of the insert;
  - a first portion between the first and the second end portions, the first portion defining a first dimension transverse to the longitudinal axis, the first portion including a first exterior surface;
  - a second portion between the first and the second end portions, the second portion defining a second dimension transverse to the longitudinal axis and including a second exterior surface, wherein the first dimension is greater than the second dimension; and
- wherein a first angle of a tangent to the first exterior surface with respect to the longitudinal axis and a second angle of a tangent to the second exterior surface with respect to the longitudinal axis differ by at least 3 degrees.

27. The electrode of claim 26, wherein the longitudinal length of the first end portion is no more than about 2% of the longitudinal length of the insert.

28. The electrode of claim 26, wherein the longitudinal length of the second end portion is no more than about 10% of the longitudinal length of the insert.

29. The electrode of claim 26, wherein the high thermionic emissivity material of the insert is hafnium or zirconium, or tungsten, or thorium or lanthanum or strontium or alloys thereof.

30. The electrode of claim 26, wherein the high thermal conductivity material of the electrode body is copper or a copper alloy.

31. The electrode of claim 26, wherein a central portion of the bore comprises at least two substantially cylindrical portions.

32. The electrode of claim 26, wherein a central body portion of the insert comprises at least two substantially cylindrical portions.

33. The electrode of claim 26, wherein at least one of a central portion of the bore and a central body portion of the insert is substantially cylindrical.

34. The electrode of claim 26, wherein the bore comprises an annular extension.

35. The electrode of claim 26, wherein the insert comprises a flared head.

36. A plasma arc torch comprising:

a torch body;

a nozzle within the torch body;

a shield disposed adjacent the nozzle, the shield protecting the nozzle from workpiece splatter;

an electrode mounted relative to the nozzle in the torch body to define a plasma chamber, the electrode comprising an electrode body formed of a high thermal conductivity material, the electrode body including a first end and a second end defining a longitudinal axis;

a bore defined by and disposed in the first end of the electrode body, the bore including a closed end and an open end, the bore defining at least a first and a second dimension each transverse to the longitudinal axis, the second dimension being closer to the closed end of the bore than the first dimension; and an insert formed of a high thermionic emissivity material disposed in the bore, the insert including an exterior end disposed near the open end of the bore and a contact end disposed near the closed end of the bore, the insert defining at least a first and a second dimension each transverse to the longitudinal axis, the second dimension being closer to the closed end of the bore than the first dimension, wherein the second dimension corresponds to an annular notch;

wherein at least one of the second dimension of the bore is greater than the first dimension of the bore, or the second dimension of the insert is greater than the first dimension of the insert.

37. The plasma arc torch of claim 36, wherein the electrode further comprises a silver sleeve disposed between the insert and the electrode body.

38. The plasma arc torch of claim 36, wherein a central portion of the bore comprises at least two substantially cylindrical portions.

39. The plasma arc torch of claim 36, wherein a central body portion of the insert comprises at least two substantially cylindrical portions.

40. The plasma arc torch of claim 36, wherein at least one of a central portion of the bore and a central body portion of the insert is substantially cylindrical.

41. The plasma arc torch of claim 36, wherein the insert comprises a projection disposed on a surface of the bore.

42. The plasma arc torch of claim 41, wherein the projection comprises at least one or more of a flared head, a barb, groove, notch, projection or threadlike pattern.

43. The plasma arc torch of claim 36, wherein the insert comprises at least one or more of a flared head, a barb, groove, notch, projection or threadlike pattern.

44. The plasma arc torch of claim 36, wherein the insert comprises a flared head, barbs, grooves, notches, projections or threadlike patterns.

* * * * *